United States Patent
Pons Bordes et al.

(10) Patent No.: US 11,784,956 B2
(45) Date of Patent: Oct. 10, 2023

(54) REQUESTS TO ADD ASSETS TO AN ASSET ACCOUNT

(71) Applicant: Apple Inc., Cupertino, CA (US)

(72) Inventors: Pablo Pons Bordes, Redwood City, CA (US); Venkata S. Akella, San Ramon, CA (US); Benjamin D. Chester, San Jose, CA (US); Tyler Gentles, San Francisco, CA (US); Laura M. Ragone, Brooklyn, NY (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/874,159

(22) Filed: Jul. 26, 2022

(65) Prior Publication Data

US 2023/0088405 A1    Mar. 23, 2023

Related U.S. Application Data

(60) Provisional application No. 63/345,343, filed on May 24, 2022, provisional application No. 63/246,288, filed on Sep. 20, 2021.

(51) Int. Cl.
| | | |
|---|---|---|
| *G06F 15/16* | (2006.01) | |
| *H04L 51/224* | (2022.01) | |
| *G06F 3/0484* | (2022.01) | |
| *H04W 4/14* | (2009.01) | |

(52) U.S. Cl.
CPC .......... *H04L 51/224* (2022.05); *G06F 3/0484* (2013.01); *H04W 4/14* (2013.01)

(58) Field of Classification Search
CPC ...... H04L 51/224; H04W 4/14; G06F 3/0484; G06Q 20/40; G06Q 20/22; G06Q 20/102; G06Q 20/105; G06Q 20/10

USPC .......................... 709/206, 204, 217
See application file for complete search history.

(56) References Cited

U.S. PATENT DOCUMENTS

| | | | |
|---|---|---|---|
| 3,586,261 A | | 6/1971 | Paine et al. |
| 4,516,207 A | | 5/1985 | Moriyama et al. |
| 5,659,165 A | * | 8/1997 | Jennings ............... G07F 7/1008 |
| | | | 902/32 |
| 5,802,208 A | | 9/1998 | Podilchuk et al. |
| 6,076,928 A | | 6/2000 | Fateh et al. |
| 6,212,548 B1 | | 4/2001 | Desimone et al. |
| 6,256,129 B1 | | 7/2001 | Kim et al. |
| 6,323,846 B1 | | 11/2001 | Westerman et al. |
| 6,570,557 B1 | | 5/2003 | Westerman et al. |
| 6,677,932 B1 | | 1/2004 | Westerman |

(Continued)

FOREIGN PATENT DOCUMENTS

| | | |
|---|---|---|
| AR | 060465 A1 | 6/2008 |
| AU | 2005256796 A1 | 1/2006 |

(Continued)

OTHER PUBLICATIONS 13 questions and answers about using Apple Pay online, online available at: http://www.it528.com/apple/1356.html, Feb. 18, 2016, 5 pages (Official Copy Only) {See Communication Under 37 CFR § 1.98(a) (3)}.

(Continued)

*Primary Examiner* — Kaylee J Huang
(74) *Attorney, Agent, or Firm* — DLA Piper LLP (US)

(57) ABSTRACT

The present disclosure generally relates to user interfaces for requesting assets be added to an asset account.

36 Claims, 21 Drawing Sheets

(56) References Cited

U.S. PATENT DOCUMENTS

| | | |
|---|---|---|
| 6,993,489 B1 | 1/2006 | Miglautsch |
| 7,370,244 B2 | 5/2008 | Breitling et al. |
| 7,415,720 B2 | 8/2008 | Jung |
| 7,454,192 B1 | 11/2008 | Zhu |
| 7,546,470 B2 | 6/2009 | Schultz |
| 7,664,638 B2 | 2/2010 | Cooper et al. |
| 7,860,936 B1 | 12/2010 | Newstadt et al. |
| 8,042,157 B2 | 10/2011 | Bennett et al. |
| 8,060,571 B2 | 11/2011 | Rao |
| 8,467,766 B2 | 6/2013 | Rackley, Iii et al. |
| 8,769,624 B2 | 7/2014 | Cotterill |
| 8,827,153 B1 | 9/2014 | Rhoades et al. |
| 8,959,360 B1 | 2/2015 | Barra |
| 9,002,322 B2 | 4/2015 | Cotterill |
| 9,117,242 B1 | 8/2015 | Ellis et al. |
| 9,123,272 B1 | 9/2015 | Baldwin et al. |
| 9,189,778 B1 | 11/2015 | Sh. Al-Rashidi |
| 9,269,083 B1 | 2/2016 | Jarajapu et al. |
| 9,294,476 B1 | 3/2016 | Lurey et al. |
| 9,477,872 B2 | 10/2016 | Sarve et al. |
| 9,847,999 B2 | 12/2017 | Van Os et al. |
| 10,032,100 B2 | 7/2018 | Mullen et al. |
| 10,089,607 B2 | 10/2018 | Ziat et al. |
| 10,223,631 B2 | 3/2019 | Mullen et al. |
| 10,248,779 B2 | 4/2019 | Song et al. |
| 10,255,545 B2 | 4/2019 | Mullen et al. |
| 10,334,054 B2 | 6/2019 | Van Os et al. |
| 10,749,967 B2 | 8/2020 | Van Os et al. |
| 10,977,651 B2 | 4/2021 | Van Os et al. |
| 11,119,626 B1* | 9/2021 | Duneja ................ G06Q 20/14 |
| 11,206,309 B2 | 12/2021 | Van Os et al. |
| 11,290,278 B2 | 3/2022 | Sumien et al. |
| 11,533,614 B1 | 12/2022 | Russell et al. |
| 11,593,773 B1* | 2/2023 | Yip ........................ G06Q 20/10 |
| 2001/0039497 A1 | 11/2001 | Hubbard |
| 2001/0049627 A1 | 12/2001 | Simpson |
| 2002/0015024 A1 | 2/2002 | Westerman et al. |
| 2002/0059295 A1 | 5/2002 | Ludtke et al. |
| 2002/0116276 A1 | 8/2002 | Ottley |
| 2003/0028639 A1 | 2/2003 | Yamamoto et al. |
| 2003/0097413 A1 | 5/2003 | Vishik et al. |
| 2003/0188183 A1 | 10/2003 | Lee et al. |
| 2004/0006479 A1 | 1/2004 | Tanaka |
| 2004/0073432 A1 | 4/2004 | Stone |
| 2004/0181695 A1 | 9/2004 | Walker et al. |
| 2004/0225609 A1 | 11/2004 | Greene |
| 2004/0242200 A1 | 12/2004 | Maeoka et al. |
| 2005/0071188 A1 | 3/2005 | Thuerk |
| 2005/0093868 A1 | 5/2005 | Hinckley |
| 2005/0096009 A1 | 5/2005 | Ackley |
| 2005/0131816 A1 | 6/2005 | Britto et al. |
| 2005/0144452 A1 | 6/2005 | Lynch et al. |
| 2005/0210394 A1 | 9/2005 | Crandall et al. |
| 2005/0219223 A1 | 10/2005 | Kotzin et al. |
| 2005/0220304 A1 | 10/2005 | Lenoir et al. |
| 2005/0244059 A1 | 11/2005 | Turski |
| 2005/0278587 A1 | 12/2005 | Breitling et al. |
| 2006/0149546 A1 | 7/2006 | Runge et al. |
| 2006/0152487 A1 | 7/2006 | Grunnet-Jepsen et al. |
| 2006/0206709 A1 | 9/2006 | Labrou et al. |
| 2006/0235796 A1 | 10/2006 | Johnson et al. |
| 2006/0288226 A1 | 12/2006 | Kowal |
| 2007/0073649 A1 | 3/2007 | Kikkoji et al. |
| 2007/0150842 A1 | 6/2007 | Chaudhri et al. |
| 2007/0157089 A1 | 7/2007 | Van Os et al. |
| 2007/0180492 A1 | 8/2007 | Hassan et al. |
| 2007/0186106 A1 | 8/2007 | Ting et al. |
| 2007/0260547 A1 | 11/2007 | Little |
| 2007/0294182 A1 | 12/2007 | Hammad |
| 2008/0042866 A1 | 2/2008 | Morse et al. |
| 2008/0114678 A1 | 5/2008 | Bennett et al. |
| 2008/0114980 A1 | 5/2008 | Sridhar |
| 2008/0208762 A1 | 8/2008 | Arthur et al. |
| 2008/0229409 A1 | 9/2008 | Miller et al. |
| 2008/0231429 A1 | 9/2008 | Leonard et al. |
| 2009/0005011 A1 | 1/2009 | Christie et al. |
| 2009/0031375 A1 | 1/2009 | Sullivan et al. |
| 2009/0050687 A1 | 2/2009 | Kon et al. |
| 2009/0054044 A1 | 2/2009 | Ikemori et al. |
| 2009/0063851 A1 | 3/2009 | Nijdam |
| 2009/0094681 A1 | 4/2009 | Sadler et al. |
| 2009/0119678 A1 | 5/2009 | Shih et al. |
| 2009/0119754 A1 | 5/2009 | Schubert |
| 2009/0122149 A1 | 5/2009 | Ishii |
| 2009/0135678 A1 | 5/2009 | Godat |
| 2009/0158390 A1 | 6/2009 | Guan |
| 2009/0165107 A1 | 6/2009 | Tojo et al. |
| 2009/0187423 A1 | 7/2009 | Kim |
| 2009/0187759 A1* | 7/2009 | Marsico .............. H04L 63/0846 |
| | | 713/181 |
| 2009/0193514 A1 | 7/2009 | Adams et al. |
| 2009/0199188 A1 | 8/2009 | Fujimaki |
| 2009/0227296 A1 | 9/2009 | Kim |
| 2009/0228938 A1 | 9/2009 | White et al. |
| 2009/0241169 A1 | 9/2009 | Dhand et al. |
| 2010/0001980 A1 | 1/2010 | Kim et al. |
| 2010/0023449 A1 | 1/2010 | Skowronek et al. |
| 2010/0042835 A1 | 2/2010 | Lee et al. |
| 2010/0064259 A1 | 3/2010 | Alexanderovitc et al. |
| 2010/0078472 A1 | 4/2010 | Lin et al. |
| 2010/0082481 A1 | 4/2010 | Lin et al. |
| 2010/0107229 A1 | 4/2010 | Najafi et al. |
| 2010/0174644 A1 | 7/2010 | Rosano et al. |
| 2010/0205065 A1* | 8/2010 | Kumar ................ G06Q 30/0601 |
| | | 705/26.1 |
| 2010/0217808 A1 | 8/2010 | Benninger |
| 2010/0248823 A1 | 9/2010 | Smith |
| 2010/0250376 A1 | 9/2010 | Nandiraju |
| 2010/0269156 A1 | 10/2010 | Hohlfeld et al. |
| 2010/0298013 A1* | 11/2010 | Cao ........................ H04W 4/24 |
| | | 455/466 |
| 2011/0035799 A1 | 2/2011 | Handler |
| 2011/0054268 A1 | 3/2011 | Fidacaro et al. |
| 2011/0106671 A1 | 5/2011 | Minnis et al. |
| 2011/0138166 A1 | 6/2011 | Peszek et al. |
| 2011/0142234 A1 | 6/2011 | Rogers |
| 2011/0149874 A1 | 6/2011 | Reif |
| 2011/0164269 A1 | 7/2011 | Kamishiro |
| 2011/0179126 A1 | 7/2011 | Wetherell et al. |
| 2011/0187497 A1 | 8/2011 | Chin |
| 2011/0214158 A1 | 9/2011 | Pasquero et al. |
| 2011/0231914 A1 | 9/2011 | Hung |
| 2011/0254683 A1 | 10/2011 | Soldan et al. |
| 2011/0282697 A1 | 11/2011 | Fitzgerald et al. |
| 2012/0024947 A1 | 2/2012 | Naelon et al. |
| 2012/0036433 A1 | 2/2012 | Zimmer et al. |
| 2012/0066731 A1 | 3/2012 | Vasquez et al. |
| 2012/0078788 A1 | 3/2012 | Gandhi |
| 2012/0095918 A1 | 4/2012 | Jurss |
| 2012/0110456 A1 | 5/2012 | Larco et al. |
| 2012/0150750 A1 | 6/2012 | Law et al. |
| 2012/0197743 A1 | 8/2012 | Grigg et al. |
| 2012/0245941 A1 | 9/2012 | Cheyer |
| 2012/0253986 A1 | 10/2012 | Chang |
| 2012/0284185 A1 | 11/2012 | Mettler et al. |
| 2013/0024371 A1 | 1/2013 | Hariramani et al. |
| 2013/0031217 A1 | 1/2013 | Rajapakse |
| 2013/0047233 A1 | 2/2013 | Fisk et al. |
| 2013/0074194 A1 | 3/2013 | White et al. |
| 2013/0082819 A1 | 4/2013 | Cotterill |
| 2013/0086637 A1 | 4/2013 | Cotterill et al. |
| 2013/0091443 A1 | 4/2013 | Park et al. |
| 2013/0151636 A1 | 6/2013 | Majeti et al. |
| 2013/0166332 A1 | 6/2013 | Hammad |
| 2013/0239202 A1 | 9/2013 | Adams et al. |
| 2013/0246954 A1 | 9/2013 | Gray et al. |
| 2013/0262857 A1 | 10/2013 | Neuman et al. |
| 2013/0333006 A1 | 12/2013 | Tapling et al. |
| 2014/0020068 A1 | 1/2014 | Desai et al. |
| 2014/0043547 A1 | 2/2014 | Marhefka |
| 2014/0052794 A1 | 2/2014 | Tucker et al. |
| 2014/0058805 A1 | 2/2014 | Paesler et al. |
| 2014/0089196 A1 | 3/2014 | Paya et al. |

(56) References Cited

U.S. PATENT DOCUMENTS

| | | | |
|---|---|---|---|
| 2014/0095380 A1* | 4/2014 | Pinski | G06Q 20/10 715/781 |
| 2014/0207679 A1 | 7/2014 | Cho | |
| 2014/0214640 A1* | 7/2014 | Mallikarjunan | G06Q 20/322 705/35 |
| 2014/0215361 A1 | 7/2014 | Hwang et al. | |
| 2014/0258292 A1 | 9/2014 | Thramann et al. | |
| 2014/0279474 A1 | 9/2014 | Evans et al. | |
| 2014/0279530 A1 | 9/2014 | Douglas et al. | |
| 2014/0279543 A1 | 9/2014 | Ruhrig | |
| 2014/0293079 A1 | 10/2014 | Milanfar et al. | |
| 2014/0298432 A1 | 10/2014 | Brown | |
| 2014/0337931 A1 | 11/2014 | Cotterill | |
| 2014/0344904 A1 | 11/2014 | Venkataramani et al. | |
| 2014/0359140 A1 | 12/2014 | Shankarraman | |
| 2014/0359456 A1 | 12/2014 | Thiele et al. | |
| 2014/0372309 A1 | 12/2014 | Bullard et al. | |
| 2014/0372920 A1 | 12/2014 | Choi et al. | |
| 2014/0379341 A1 | 12/2014 | Seo et al. | |
| 2015/0003595 A1 | 1/2015 | Yaghi et al. | |
| 2015/0005039 A1 | 1/2015 | Liu et al. | |
| 2015/0012435 A1 | 1/2015 | Wright et al. | |
| 2015/0019944 A1 | 1/2015 | Kalgi | |
| 2015/0039494 A1 | 2/2015 | Sinton et al. | |
| 2015/0044964 A1 | 2/2015 | Khan et al. | |
| 2015/0095175 A1 | 4/2015 | Dua | |
| 2015/0120545 A1 | 4/2015 | Fiore et al. | |
| 2015/0135282 A1 | 5/2015 | Kong et al. | |
| 2015/0154589 A1 | 6/2015 | Li | |
| 2015/0154676 A1 | 6/2015 | Matousek et al. | |
| 2015/0186892 A1 | 7/2015 | Zhang et al. | |
| 2015/0195133 A1 | 7/2015 | Sheets et al. | |
| 2015/0213542 A1 | 7/2015 | Wallaja | |
| 2015/0215128 A1 | 7/2015 | Pal | |
| 2015/0229750 A1 | 8/2015 | Zhou et al. | |
| 2015/0230277 A1 | 8/2015 | Omeara et al. | |
| 2015/0242611 A1 | 8/2015 | Cotterill | |
| 2015/0242837 A1 | 8/2015 | Yarbrough et al. | |
| 2015/0249540 A1 | 9/2015 | Khalil et al. | |
| 2015/0254661 A1 | 9/2015 | Lanc | |
| 2015/0262183 A1 | 9/2015 | Gervais et al. | |
| 2015/0264111 A1 | 9/2015 | Aleksandrov | |
| 2015/0278799 A1 | 10/2015 | Palanisamy | |
| 2015/0278814 A1 | 10/2015 | Jaffe | |
| 2015/0286694 A1 | 10/2015 | Kaplinger et al. | |
| 2015/0295921 A1 | 10/2015 | Cao | |
| 2015/0340025 A1 | 11/2015 | Shima | |
| 2015/0348001 A1 | 12/2015 | Van Os et al. | |
| 2015/0348002 A1 | 12/2015 | Van et al. | |
| 2015/0365400 A1 | 12/2015 | Cox | |
| 2016/0005024 A1 | 1/2016 | Harrell | |
| 2016/0011768 A1 | 1/2016 | Yim et al. | |
| 2016/0012417 A1 | 1/2016 | Mizon | |
| 2016/0026779 A1 | 1/2016 | Grigg et al. | |
| 2016/0034887 A1 | 2/2016 | Lee | |
| 2016/0050199 A1 | 2/2016 | Ganesan | |
| 2016/0062487 A1 | 3/2016 | Foss et al. | |
| 2016/0063298 A1 | 3/2016 | Tuneld et al. | |
| 2016/0078281 A1 | 3/2016 | Gongaware et al. | |
| 2016/0086166 A1 | 3/2016 | Pomeroy et al. | |
| 2016/0086176 A1 | 3/2016 | Henrique et al. | |
| 2016/0092665 A1 | 3/2016 | Cowan et al. | |
| 2016/0098882 A1 | 4/2016 | Holdych et al. | |
| 2016/0104159 A1 | 4/2016 | Butterfield et al. | |
| 2016/0117670 A1 | 4/2016 | Davis | |
| 2016/0132864 A1 | 5/2016 | Shah et al. | |
| 2016/0134488 A1 | 5/2016 | Straub et al. | |
| 2016/0156574 A1 | 6/2016 | Hum et al. | |
| 2016/0171481 A1 | 6/2016 | Mcelmurry et al. | |
| 2016/0171482 A1 | 6/2016 | Muncey et al. | |
| 2016/0180316 A1 | 6/2016 | Wang et al. | |
| 2016/0180325 A1 | 6/2016 | Davis et al. | |
| 2016/0180578 A1 | 6/2016 | Vegesna | |
| 2016/0189717 A1 | 6/2016 | Kannan et al. | |
| 2016/0225371 A1 | 8/2016 | Agrawal et al. | |
| 2016/0241543 A1 | 8/2016 | Jung et al. | |
| 2016/0260031 A1 | 9/2016 | Pace et al. | |
| 2016/0267447 A1* | 9/2016 | Davis | G06Q 20/10 |
| 2016/0267779 A1 | 9/2016 | Kuang | |
| 2016/0270144 A1 | 9/2016 | Thanayankizil et al. | |
| 2016/0277342 A1 | 9/2016 | Shi | |
| 2016/0314451 A1 | 10/2016 | Martin | |
| 2016/0345172 A1 | 11/2016 | Cotterill | |
| 2016/0352667 A1 | 12/2016 | Pickett et al. | |
| 2016/0358167 A1 | 12/2016 | Van Os et al. | |
| 2016/0364715 A1 | 12/2016 | Cho et al. | |
| 2016/0378186 A1 | 12/2016 | Kim | |
| 2016/0378961 A1 | 12/2016 | Park | |
| 2017/0004484 A1 | 1/2017 | Seol et al. | |
| 2017/0046111 A1 | 2/2017 | Chu et al. | |
| 2017/0054731 A1 | 2/2017 | Cotterill | |
| 2017/0090589 A1 | 3/2017 | Sharma et al. | |
| 2017/0123498 A1 | 5/2017 | Dillon et al. | |
| 2017/0180813 A1 | 6/2017 | Kang et al. | |
| 2017/0193501 A1 | 7/2017 | Cole et al. | |
| 2017/0228704 A1 | 8/2017 | Zhou et al. | |
| 2017/0237692 A1 | 8/2017 | Sheth et al. | |
| 2017/0289071 A1* | 10/2017 | Roberts | H04L 67/01 |
| 2017/0339151 A1 | 11/2017 | Van Os et al. | |
| 2017/0339347 A1 | 11/2017 | Cho et al. | |
| 2017/0344526 A1 | 11/2017 | Smith et al. | |
| 2017/0357443 A1 | 12/2017 | Paek et al. | |
| 2017/0357973 A1 | 12/2017 | Van Os et al. | |
| 2018/0053169 A1 | 2/2018 | James | |
| 2018/0053180 A1 | 2/2018 | Cho et al. | |
| 2018/0109482 A1 | 4/2018 | Deluca et al. | |
| 2018/0109629 A1 | 4/2018 | Van Os et al. | |
| 2018/0197170 A1 | 7/2018 | Zhang et al. | |
| 2018/0218359 A1 | 8/2018 | Kim et al. | |
| 2018/0240086 A1 | 8/2018 | Sobotka | |
| 2018/0302790 A1 | 10/2018 | Cotterill | |
| 2018/0335928 A1 | 11/2018 | Van Os et al. | |
| 2018/0336543 A1 | 11/2018 | Van Os et al. | |
| 2019/0124510 A1 | 4/2019 | Cotterill | |
| 2019/0289079 A1 | 9/2019 | Van Os et al. | |
| 2020/0120503 A1 | 4/2020 | Cotterill | |
| 2020/0143353 A1 | 5/2020 | Van Os et al. | |
| 2020/0366742 A1 | 11/2020 | Van Os et al. | |
| 2020/0372514 A1 | 11/2020 | Van Os et al. | |
| 2021/0027269 A1 | 1/2021 | Van Os et al. | |
| 2021/0272092 A1 | 9/2021 | Van Os et al. | |
| 2021/0272118 A1 | 9/2021 | Van Os et al. | |
| 2021/0312417 A1* | 10/2021 | Omojola | G06Q 20/40 |
| 2021/0397681 A1 | 12/2021 | Boule et al. | |
| 2022/0058257 A1 | 2/2022 | Cotterill | |
| 2022/0374863 A1* | 11/2022 | Lipshultz | G06Q 20/3223 |

FOREIGN PATENT DOCUMENTS

| | | |
|---|---|---|
| CN | 1452739 A | 10/2003 |
| CN | 1663174 A | 8/2005 |
| CN | 1741104 A | 3/2006 |
| CN | 1846221 A | 10/2006 |
| CN | 1908981 A | 2/2007 |
| CN | 101128794 A | 2/2008 |
| CN | 101268470 A | 9/2008 |
| CN | 101299694 A | 11/2008 |
| CN | 101341718 A | 1/2009 |
| CN | 101341727 A | 1/2009 |
| CN | 101485128 A | 7/2009 |
| CN | 101610155 A | 12/2009 |
| CN | 102065148 A | 5/2011 |
| CN | 102164213 A | 8/2011 |
| CN | 102202192 A | 9/2011 |
| CN | 102209321 A | 10/2011 |
| CN | 102396205 A | 3/2012 |
| CN | 102541438 A | 7/2012 |
| CN | 102737313 A | 10/2012 |
| CN | 104885089 A | 9/2015 |
| CN | 105354034 A | 2/2016 |
| CN | 106506322 A | 3/2017 |
| EP | 2180665 A1 | 4/2010 |
| EP | 2674889 A2 | 12/2013 |
| EP | 2980741 A1 | 2/2016 |

(56) References Cited

FOREIGN PATENT DOCUMENTS

| | | |
|---|---|---|
| EP | 3062271 A1 | 8/2016 |
| EP | 3096275 A1 | 11/2016 |
| EP | 3047622 B1 | 8/2017 |
| EP | 3349400 A1 | 7/2018 |
| GB | 2466038 A | 6/2010 |
| JP | 2000-259477 A | 9/2000 |
| JP | 2001-331758 A | 11/2001 |
| JP | 2003-67210 A | 3/2003 |
| JP | 2004-37998 A | 2/2004 |
| JP | 2004-356816 A | 12/2004 |
| JP | 2006-222531 A | 8/2006 |
| JP | 2007-226794 A | 9/2007 |
| JP | 2010-271779 A | 12/2010 |
| JP | 2011-503711 A | 1/2011 |
| JP | 2012-113600 A | 6/2012 |
| JP | 2013-157959 A | 8/2013 |
| JP | 2013-229656 A | 11/2013 |
| JP | 2014-517366 A | 7/2014 |
| JP | 2014-520296 A | 8/2014 |
| JP | 2015-14923 A | 1/2015 |
| JP | 2015-534664 A | 12/2015 |
| JP | 6023162 B2 | 11/2016 |
| JP | 2017-41098 A | 2/2017 |
| JP | 2018-506103 A | 3/2018 |
| JP | 2018-524679 A | 8/2018 |
| KR | 10-2004-0027236 A | 4/2004 |
| KR | 10-2007-0120125 A | 12/2007 |
| KR | 10-0805341 B1 | 2/2008 |
| KR | 10-2009-0089472 A | 8/2009 |
| KR | 10-1253392 B1 | 4/2013 |
| KR | 10-1342208 B1 | 12/2013 |
| KR | 10-2014-0094801 A | 7/2014 |
| KR | 10-2014-0131093 A | 11/2014 |
| KR | 10-2014-0137400 A | 12/2014 |
| KR | 10-2014-0139982 A | 12/2014 |
| KR | 10-2016-0045633 A | 4/2016 |
| KR | 10-2016-0054573 A | 5/2016 |
| KR | 10-2016-0076201 A | 6/2016 |
| KR | 10-2016-0105279 A | 9/2016 |
| KR | 10-2016-0132457 A | 11/2016 |
| KR | 10-2017-0011784 A | 2/2017 |
| KR | 10-1820573 B1 | 1/2018 |
| KR | 10-2018-0051556 A | 5/2018 |
| WO | 99/44114 A1 | 9/1999 |
| WO | 02/01864 A1 | 1/2002 |
| WO | 2006/113834 A2 | 10/2006 |
| WO | 2007/073422 A1 | 6/2007 |
| WO | 2008/151229 A1 | 12/2008 |
| WO | 2010/120972 A1 | 10/2010 |
| WO | 2010/128442 A2 | 11/2010 |
| WO | 2011/037134 A1 | 3/2011 |
| WO | 2012/129231 A1 | 9/2012 |
| WO | 2013/000150 A1 | 1/2013 |
| WO | 2014/105631 A2 | 7/2014 |
| WO | 2014/147297 A1 | 9/2014 |
| WO | 2014/172757 A1 | 10/2014 |
| WO | 2015/057320 A1 | 4/2015 |
| WO | 2015/062410 A1 | 5/2015 |
| WO | 2015/138865 A2 | 9/2015 |
| WO | 2016/032534 A1 | 3/2016 |
| WO | 2016/036472 A1 | 3/2016 |
| WO | 2017/030642 A1 | 2/2017 |
| WO | 2017/041641 A1 | 3/2017 |
| WO | 2017/072589 A2 | 5/2017 |
| WO | 2017/078792 A1 | 5/2017 |

OTHER PUBLICATIONS

Advisory Action received for U.S. Appl. No. 15/250,152, dated Mar. 25, 2019, 5 pages.
Applicant Initiated Interview Summary received for U.S. Appl. No. 15/433,320, dated Feb. 11, 2020, 5 pages.
Applicant-Initiated Interview Summary received for U.S. Appl. No. 15/433,320, dated Nov. 25, 2020, 4 pages.
Applicant-Initiated Interview Summary received for U.S. Appl. No. 15/884,195, dated Apr. 28, 2020, 5 pages.
Applicant-Initiated Interview Summary received for U.S. Appl. No. 15/884,195, dated Aug. 17, 2021, 4 pages.
Applicant-Initiated Interview Summary received for U.S. Appl. No. 15/884,195, dated Dec. 17, 2020, 3 pages.
Applicant-Initiated Interview Summary received for U.S. Appl. No. 15/981,817, dated Apr. 22, 2020, 5 pages.
Applicant-Initiated Interview Summary received for U.S. Appl. No. 16/670,949, dated Apr. 6, 2021, 2 pages.
Applicant-Initiated Interview Summary received for U.S. Appl. No. 16/736,704, dated Aug. 27, 2020, 5 pages.
Applicant-Initiated Interview Summary received for U.S. Appl. No. 16/736,704, dated Dec. 11, 2020, 4 pages.
Applicant-Initiated Interview Summary received for U.S. Appl. No. 17/037,085, dated Sep. 27, 2021, 4 pages.
Board Decision received for Chinese Patent Application No. 201810338826.7, dated May 30, 2022, 20 pages (2 pages of English Translation and 18 pages of Official Copy).
Board Opinion received for Chinese Patent Application No. 201810338826.7, dated Jan. 19, 2022, 18 pages (6 pages of English Translation and 12 pages of Official Copy).
Certificate of Examination received for Australian Patent Application No. 2017100553, dated Jan. 17, 2018, 2 pages.
Certificate of Examination received for Australian Patent Application No. 2018101014, dated Mar. 20, 2019, 2 pages.
Corrected Notice of Allowance received for U.S. Appl. No. 15/269,801, dated Oct. 3, 2017, 4 pages.
Corrected Notice of Allowance received for U.S. Appl. No. 15/845,794, dated Feb. 25, 2019, 2 pages.
Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
Corrected Notice of Allowance received for U.S. Appl. No. 16/670,949, dated Sep. 8, 2021, 2 pages.
Corrected Notice of Allowance received for U.S. Appl. No. 16/987,003, dated Sep. 1, 2021, 3 pages.
Decision to Grant received for Danish Patent Application No. PA201670628, dated Nov. 20, 2017, 2 pages.
Decision to Grant received for Danish Patent Application No. PA201770502, dated Feb. 25, 2021, 2 pages.
Decision to Grant received for Danish Patent Application No. PA201770503, dated Feb. 14, 2020, 2 pages.
Decision to Grant received for Danish Patent Application No. PA201770782, dated Oct. 25, 2019, 2 pages.
Decision to Grant received for European Patent Application No. 12773460.6, dated Jun. 27, 2019, 2 pages.
Decision to Grant received for Japanese Patent Application No. 2017-075031, dated Jul. 1, 2019, 3 pages (1 page of English Translation and 2 pages of Official Copy).
Decision to Refuse received for European Patent Application No. 12770400.5, dated Nov. 8, 2018, 12 pages.
European Search Report received for European Patent Application No. 20204436.8, dated Mar. 9, 2021, 5 pages.
Extended European Search Report for European Application No. 17813737.8, dated Nov. 22, 2019, 9 pages.
Extended European Search Report received for European Patent Application No. 17799904.2, dated Jul. 30, 2018, 7 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19186538.5, dated Oct. 9, 2019, 10 pages.
Final Office Action received for U.S. Appl. No. 13/248,882, dated Dec. 4, 2013, 22 pages.
Final Office Action received for U.S. Appl. No. 14/285,378, dated Jul. 23, 2015, 19 pages.
Final Office Action received for U.S. Appl. No. 15/433,320, dated Dec. 31, 2019, 30 pages.
Final Office Action received for U.S. Appl. No. 15/884,195, dated Feb. 22, 2021, 26 pages.

(56) References Cited

OTHER PUBLICATIONS

Final Office Action received for U.S. Appl. No. 15/884,195, dated Sep. 29, 2020, 20 pages.
Final Office Action received for U.S. Appl. No. 16/736,704, dated Oct. 13, 2020, 62 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Hartl et al., "Efficient Verification of Holograms Using Mobile Augmented Reality", IEEE Transactions on Visualization and Computer Graphics, vol. 22, No. 7, Online available at: https://arbook.icg.tugraz.at/schmalstieg/Schmalstieg_302.pdf, 2015, 9 pages.
Intention to Grant received for Danish Patent Application No. PA201670628, dated Aug. 28, 2017, 2 pages.
Intention to Grant received for Danish Patent Application No. PA201770502, dated Oct. 6, 2020, 2 pages.
Intention to Grant received for Danish Patent Application No. PA201770503, dated Nov. 11, 2019, 2 pages.
Intention to Grant received for Danish Patent Application No. PA201770782, dated Aug. 8, 2019, 2 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2018/033054, dated Nov. 28, 2019, 21 pages.
International Search Report and Written Opinion received for PCT Patent Application No. PCT/US2018/033054, dated Oct. 30, 2018, 32 pages.
International Search Report and Written Opinion received for PCT Patent Application No. PCT/US17/31086, dated Sep. 8, 2017, 15 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2021/037949, dated Nov. 12, 2021, 19 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fees and Partial International Search Report received for PCT Patent Application No. PCT/US2021/037949, dated Sep. 22, 2021, 13 pages.
Invitation to Pay Additional Fees received for PCT Patent Application No. PCT/US2018/033054, dated Sep. 4, 2018, 25 pages.
Invitation to Pay Search Fees received for European Patent Application No. 18730556.0, dated Mar. 2, 2020, 3 pages.
Minutes of the Oral Proceedings received for European Application No. 12770400.5, mailed on Nov. 6, 2018, 7 pages.
Non-Final Office Action received for U.S. Appl. No. 17/037,085, dated Jul. 8, 2021, 37 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/642,366, dated Aug. 24, 2015, 7 pages.
Non-Final Office Action received for U.S. Appl. No. 15/134,638, dated Sep. 20, 2016, 6 pages.
Non-Final Office Action received for U.S. Appl. No. 15/269,801, dated Dec. 30, 2016, 17 pages.
Non-Final Office Action received for U.S. Appl. No. 15/433,320, dated Jul. 31, 2020, 13 pages.
Non-Final Office Action received for U.S. Appl. No. 15/845,794, dated Oct. 15, 2018, 8 pages.
Non-Final Office Action received for U.S. Appl. No. 15/884,195, dated Feb. 27, 2020, 18 pages.
Non-Final Office Action received for U.S. Appl. No. 15/884,195, dated May 18, 2021, 26 pages.
Non-Final Office Action received for U.S. Appl. No. 15/981,817, dated Jan. 2, 2020, 31 pages.
Non-Final Office Action received for U.S. Appl. No. 16/434,865, dated Jan. 16, 2020, 9 pages.
Non-Final Office Action received for U.S. Appl. No. 16/670,949, dated Dec. 9, 2020, 11 pages.
Non-Final Office Action received for U.S. Appl. No. 16/736,704, dated May 1, 2020, 41 pages.
Non-Final Office Action received for U.S. Appl. No. 16/987,003, dated May 10, 2021, 20 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Notice of Acceptance received for Australian Patent Application No. 2017266867, dated Mar. 6, 2019, 3 pages.
Notice of Acceptance received for Australian Patent Application No. 2017284013, dated Aug. 26, 2020, 3 pages.
Notice of Acceptance received for Australian Patent Application No. 2018269512, dated Jan. 28, 2020, 3 pages.
Notice of Acceptance received for Australian Patent Application No. 2019203473, dated Nov. 7, 2019, 3 pages.
Notice of Acceptance received for Australian Patent Application No. 2020202953, dated Oct. 1, 2021, 3 pages.
Notice of Acceptance received for Australian Patent Application No. 2020273355, dated Jan. 17, 2022, 3 pages.
Notice of Allowance received for Chinese Patent Application No. 201280047459.6, dated Jan. 31, 2018, 2 pages (1 page of English Translation and 1 page of Official Copy).
Notice of Allowance received for Chinese Patent Application No. 201780002398.4, dated Jun. 17, 2019, 2 pages (1 page of English Translation and 1 page of Official Copy).
Notice of Allowance received for Chinese Patent Application No. 201780033899.9, dated Feb. 8, 2022, 2 pages (1 page of English Translation and 1 page of Official Copy).
Notice of Allowance received for Chinese Patent Application No. 201810338038.8, dated Jun. 30, 2020, 2 pages (1 page of English Translation and 1 page of Official Copy).
Notice of Allowance received for Chinese Patent Application No. 201810338040.5, dated Mar. 30, 2022, 6 pages (2 pages of English Translation and 4 pages of Official Copy).

(56) References Cited

OTHER PUBLICATIONS

Notice of Allowance received for Chinese Patent Application No. 201810339290.0, dated Mar. 9, 2022, 2 pages (1 page of English Translation and 1 page of Official Copy).
Notice of Allowance received for Chinese Patent Application No. 201811460172.1, dated Jan. 11, 2021, 2 pages (1 page of English Translation and 1 page of Official Copy).
Notice of Allowance received for Chinese Patent Application No. 202010174749.3, dated Oct. 28, 2021, 4 pages (3 pages of English Translation and 1 page of Official Copy).
Notice of Allowance received for Chinese Patent Application No. 202011206499.3, dated Feb. 14, 2022, 6 pages (3 pages of English Translation and 3 pages of Official Copy).
Notice of Allowance received for Japanese Patent Application No. 2018-560107, dated Dec. 6, 2019, 4 pages (1 page of English Translation and 3 pages of Official Copy).
Notice of Allowance received for Japanese Patent Application No. 2019-238894, dated Oct. 5, 2020, 4 pages (1 page of English Translation and 3 pages of Official Copy).
Notice of Allowance received for Japanese Patent Application No. 2019-572834, dated Nov. 1, 2021, 5 pages (1 page of English Translation and 4 pages of Official Copy).
Notice of Allowance received for Korean Patent Application No. 10-2016-7035555, dated Sep. 23, 2019, 3 pages (1 page of English Translation and 2 pages of Official Copy).
Notice of Allowance received for Korean Patent Application No. 10-2017-7012145, dated Oct. 30, 2019, 3 pages (1 page of English Translation and 2 pages of Official Copy).
Notice of Allowance received for Korean Patent Application No. 10-2018-7033301, dated Feb. 20, 2019, 5 pages (2 Pages of English Translation and 3 Pages of Official Copy).
Notice of Allowance received for Korean Patent Application No. 10-2019-7014494, dated Mar. 19, 2020, 4 pages (1 page of English Translation and 3 pages of Official Copy).
Notice of Allowance received for Korean Patent Application No. 10-2019-7033768, dated Jun. 3, 2020, 6 pages (2 pages of English Translation and 4 pages of Official Copy).
Notice of Allowance received for Korean Patent Application No. 10-2020-7002929, dated Nov. 26, 2020, 3 pages (1 page of English Translation and 2 pages of Official Copy).
Notice of Allowance received for Korean Patent Application No. 10-2020-7017803, dated Nov. 5, 2020, 6 pages (2 pages of English Translation and 4 pages of Official Copy).
Notice of Allowance received for Korean Patent Application No. 10-2020-7025711, dated Jan. 19, 2021, 6 pages (2 pages of English Translation and 4 pages of Official Copy).
Notice of Allowance received for Korean Patent Application No. 10-2021-7005691, dated Mar. 29, 2021, 3 pages (1 page of English Translation and 2 pages of Official Copy).
Notice of Allowance received for Korean Patent Application No. 10-2021-7011434, dated Jul. 29, 2021, 5 pages (2 pages of English Translation and 3 pages of Official Copy).
Notice of Allowance received for Korean Patent Application No. 10-2021-7020549, dated Jul. 13, 2021, 3 pages (1 page of English Translation and 2 pages of Official Copy).
Notice of Allowance received for Korean Patent Application No. 10-2021-7032984, dated Jun. 29, 2022, 5 pages (2 pages of English Translation and 3 pages of Official Copy).
Notice of Allowance received for Korean Patent Application No. 10-2021-7035417, dated Jan. 3, 2022, 5 pages (1 page of English Translation and 4 pages of Official Copy).
Notice of Allowance received for Korean Patent Application No. 10-2022-7007288, dated Mar. 17, 2022, 5 pages (1 page of English Translation and 4 pages of Official Copy).
Notice of Allowance received for Korean Patent Application No. 10-2014-7008348, dated Feb. 21, 2019, 5 pages (2 pages of English Translation and 3 pages of Official Copy).
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/285,378, dated May 19, 2016, 10 pages.
Notice of Allowance received for U.S. Appl. No. 14/642,366, dated Jan. 14, 2016, 8 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/433,320, dated Apr. 1, 2021, 19 pages.
Notice of Allowance received for U.S. Appl. No. 15/845,794, dated Feb. 14, 2019, 6 pages.
Notice of Allowance received for U.S. Appl. No. 15/884,195, dated Nov. 17, 2021, 19 pages.
Notice of Allowance received for U.S. Appl. No. 15/945,610, dated May 20, 2019, 7 pages.
Notice of Allowance received for U.S. Appl. No. 15/981,817, dated May 28, 2020, 16 pages.
Notice of Allowance received for U.S. Appl. No. 16/131,767, dated Sep. 6, 2019, 7 pages.
Notice of Allowance received for U.S. Appl. No. 16/434,865, dated Apr. 7, 2020, 5 pages.
Notice of Allowance received for U.S. Appl. No. 16/670,949, dated May 27, 2021, 7 pages.
Notice of Allowance received for U.S. Appl. No. 16/670,949, dated Sep. 14, 2021, 7 pages.
Notice of Allowance received for U.S. Appl. No. 16/736,704, dated Feb. 23, 2021, 11 pages.
Notice of Allowance received for U.S. Appl. No. 16/987,003, dated Aug. 18, 2021, 9 pages.
Notice of Allowance received for U.S. Appl. No. 17/037,085, dated Nov. 10, 2021, 10 pages.
Office Action received for Australian Patent Application No. 2017100553, dated Aug. 4, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017266867, dated Dec. 6, 2018, 3 pages.
Office Action received for Australian Patent Application No. 2017284013, dated Mar. 19, 2020, 3 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2019203473, dated Oct. 25, 2019, 2 pages.
Office Action received for Australian Patent Application No. 2020202953, dated Mar. 29, 2021, 4 pages.
Office Action received for Australian Patent Application No. 2020273355, dated Jul. 6, 2021, 3 pages.
Office Action received for Australian Patent Application No. 2020273355, dated Nov. 23, 2021, 6 pages.
Office Action received for Chinese Patent Application No. 201711292804.3, dated Aug. 5, 2020, 26 pages (16 pages of English Translation and 10 pages of Official Copy).
Office Action received for Chinese Patent Application No. 201711292804.3, dated Feb. 23, 2021, 17 pages (8 pages of English Translation and 9 pages of Official Copy).
Office Action received for Chinese Patent Application No. 201711292804.3, dated Sep. 10, 2021, 19 pages (8 pages of English Translation and 11 pages of Official Copy).

(56) References Cited

OTHER PUBLICATIONS

Office Action received for Chinese Patent Application No. 201780002398.4, dated Feb. 27, 2019, 6 pages (3 pages of English Translation and 3 pages of Official Copy).
Office Action received for Chinese Patent Application No. 201780002398.4, dated Sep. 12, 2018, 17 pages (5 pages of English Translation and 12 pages of Official Copy).
Office Action received for Chinese Patent Application No. 201780033899.9, dated Sep. 3, 2021, 12 pages (6 pages of English Translation and 6 pages of Official Copy).
Office Action received for Chinese Patent Application No. 201810338038.8, dated Jan. 21, 2020, 26 pages (13 pages of English Translation and 13 pages of Official Copy).
Office Action received for Chinese Patent Application No. 201810338038.8, dated May 14, 2019, 26 pages (13 pages of English Translation and 13 pages of Official Copy).
Office Action received for Chinese Patent Application No. 201810338040.5, dated Jun. 3, 2021, 25 pages (15 pages of English Translation and 10 pages of Official Copy).
Office Action received for Chinese Patent Application No. 201810338040.5, dated Oct. 25, 2021, 22 pages (13 pages of English Translation and 9 pages of Official Copy).
Office Action received for Chinese Patent Application No. 201810338826.7, dated Apr. 3, 2019, 21 pages (13 pages of English Translation and 8 pages of Official Copy).
Office Action received for Chinese Patent Application No. 201810338826.7, dated Jan. 16, 2020, 16 pages (10 pages of English Translation and 6 pages of Official Copy).
Office Action received for Chinese Patent Application No. 201810338826.7, dated Oct. 21, 2019, 19 pages (12 pages of English Translation and 7 pages of Official Copy).
Office Action received for Chinese Patent Application No. 201810339290.0, dated Jun. 4, 2021, 20 pages (11 pages of English Translation and 9 pages of Official Copy).
Office Action received for Chinese Patent Application No. 201810339290.0, dated Oct. 18, 2021, 20 pages (11 pages of English Translation and 9 pages of Official Copy).
Office Action received for Chinese Patent Application No. 201811460172.1, dated Jan. 21, 2020, 17 pages (8 pages of English Translation and 9 pages of Official Copy).
Office Action received for Chinese Patent Application No. 201811460172.1, dated Oct. 14, 2020, 7 pages (4 pages of English Translation and 3 pages of Official Copy).
Office Action received for Chinese Patent Application No. 202010174749.3, dated Jun. 2, 2021, 19 pages (10 pages of English Translation and 9 pages of Official Copy).
Office Action received for Chinese Patent Application No. 202010174749.3, dated Nov. 6, 2020, 9 pages (3 pages of English Translation and 6 pages of Official Copy).
Office Action received for Chinese Patent Application No. 202011206499.3, dated May 21, 2021, 20 pages (10 pages of English Translation and 10 pages of Official Copy).
Office Action received for Chinese Patent Application No. 202011206499.3, dated Sep. 28, 2021, 7 pages (4 pages of English Translation and 3 pages of Official Copy).
Office Action received for Danish Patent Application No. PA201670622, dated Aug. 17, 2018, 4 pages.
Office Action received for Danish Patent Application No. PA201670622, dated May 30, 2017, 4 pages.
Office Action received for Danish Patent Application No. PA201670622, dated Nov. 1, 2017, 5 pages.
Office Action received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770502, dated Dec. 14, 2018, 7 pages.
Office Action received for Danish Patent Application No. PA201770502, dated Jan. 20, 2020, 2 pages.
Office Action received for Danish Patent Application No. PA201770502, dated May 7, 2020, 5 pages.
Office Action received for Danish Patent Application No. PA201770502, dated Sep. 9, 2019, 2 pages.
Office Action received for Danish Patent Application No. PA201770503, dated Dec. 19, 2018, 6 pages.
Office Action received for Danish Patent Application No. PA201770503, dated Nov. 24, 2017, 10 pages.
Office Action received for Danish Patent Application No. PA201770503, dated Sep. 20, 2019, 5 pages.
Office Action received for Danish Patent Application No. PA201770505, dated Aug. 18, 2021, 2 pages.
Office Action received for Danish Patent Application No. PA201770505, dated Jan. 17, 2020, 7 pages.
Office Action received for Danish Patent Application No. PA201770505, dated Jul. 27, 2018, 4 pages.
Office Action received for Danish Patent Application No. PA201770505, dated May 20, 2019, 7 pages.
Office Action received for Danish Patent Application No. PA201770505, dated Sep. 19, 2017, 10 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 17799904.2, dated Oct. 21, 2020, 6 pages.
Office Action received for European Patent Application No. 17813737.8, dated Apr. 16, 2021, 7 pages.
Office Action received for European Patent Application No. 18208881.5, dated Jun. 11, 2019, 5 pages.
Office Action received for European Patent Application No. 18208881.5, dated May 7, 2021, 6 pages.
Office Action received for European Patent Application No. 18730556.0, dated Dec. 16, 2020, 7 pages.
Office Action received for European Patent Application No. 18730556.0, dated Jun. 23, 2020, 11 pages.
Office Action received for European Patent Application No. 19150528.8, dated Jul. 1, 2020, 6 pages.
Office Action received for European Patent Application No. 19186538.5, dated Oct. 12, 2020, 7 pages.
Office Action received for European Patent Application No. 19186538.5, dated Oct. 22, 2021, 7 pages.
Office Action received for European Patent Application No. 20204436.8, dated Mar. 22, 2021, 10 pages.
Office Action received for Japanese Patent Application No. 2017-075031, dated Jul. 30, 2018, 16 pages (8 pages of English Translation and 8 pages of Official Copy).
Office Action received for Japanese Patent Application No. 2018-560107, dated Jun. 14, 2019, 26 pages (13 pages of English Translation and 13 pages of Official Copy).
Office Action received for Japanese Patent Application No. 2019-238894, dated Mar. 6, 2020, 7 pages (3 pages of English Translation and 4 pages of Official Copy).
Office Action received for Japanese Patent Application No. 2019-572834, dated Dec. 4, 2020, 7 pages (3 pages of English Translation and 4 pages of Official Copy).
Office Action received for Japanese Patent Application No. 2019-572834, dated Jul. 17, 2020, 13 pages (7 pages of English Translation and 6 pages of Official Copy).
Office Action received for Japanese Patent Application No. 2019-572834, dated Jun. 7, 2021, 5 pages (2 pages of English Translation and 3 pages of Official Copy).
Office Action received for Japanese Patent Application No. 2020-184605, dated Feb. 14, 2022, 24 pages (11 pages of English Translation and 13 pages of Official Copy).

(56) References Cited

OTHER PUBLICATIONS

Office Action received for Korean Patent Application No. 10-2014-7008348, dated Jan. 22, 2019, 16 pages (1 page of English Translation and 15 pages of Official Copy).
Office Action received for Korean Patent Application No. 10-2016-7035555, dated Dec. 26, 2017, 5 pages (2 pages of English Translation and 3 pages of Official Copy).
Office Action received for Korean Patent Application No. 10-2016-7035555, dated Jul. 18, 2019, 9 pages (4 pages of English Translation and 5 pages of Official Copy).
Office Action received for Korean Patent Application No. 10-2016-7035555, dated Sep. 18, 2018, 9 pages (4 pages of English Translation and 5 pages of Official Copy).
Office Action received for Korean Patent Application No. 10-2017-7012145, dated Jul. 18, 2019, 5 pages (2 pages of English Translation and 3 pages of Official Copy).
Office Action received for Korean Patent Application No. 10-2017-7012145, dated Sep. 13, 2018, 6 pages (3 pages of English Translation and 3 pages of Official Copy).
Office Action received for Korean Patent Application No. 10-2018-7033301, dated Dec. 14, 2018, 6 pages (2 pages of English Translation and 4 pages of Official Copy).
Office Action received for Korean Patent Application No. 10-2019-7014494, dated Jun. 14, 2019, 11 pages (5 pages of English Translation and 6 pages of Official Copy).
Office Action received for Korean Patent Application No. 10-2019-7033768, dated Mar. 13, 2020, 6 pages (2 pages of English Translation and 4 pages of Official Copy).
Office Action received for Korean Patent Application No. 10-2020-7002929, dated Mar. 22, 2020, 5 pages (2 pages of English Translation and 3 pages of Official Copy).
Office Action received for Korean Patent Application No. 10-2020-7025711, dated Sep. 11, 2020, 12 pages (5 pages of English Translation and 7 pages of Official Copy).
Office Action received for Korean Patent Application No. 10-2021-7011434, dated Apr. 28, 2021, 6 pages (2 pages of English Translation and 4 pages of Official Copy).
Office Action received for Korean Patent Application No. 10-2021-7032984, dated Feb. 22, 2022, 8 pages (4 pages of English Translation and 4 pages of Official Copy).
Office Action received for Korean Patent Application No. 10-2022-7019902, dated Jul. 1, 2022, 10 pages (4 pages of English Translation and 6 pages of Official Copy).
Pu Fang, "Research on Location-aware Service in Pervasive Computing", Issue No. 7, Information Technology Series, China Doctoral Dissertations, Jul. 15, 2008, 140 pages (Official Copy Only) {See Communication Under 37 CFR § 1.98(a) (3)}.
Punchkick Interactive, "Punchkick hands-on review: Fitbit Surge", URL: https://www.youtube.com/watch?v=K2G7aebUYcA, Mar. 25, 2015, 3 pages.
Qiye Wang, "Design and Implementation of SAN Device Access Control in Unified Storage Platform", Master's Theses, Huazhong University of Science & Technology, Wuhan, Jun. 2008, 63 pages (Official Copy only) {See Communication Under 37 CFR § 1.98(a) (3)}.
Search Report and Opinion received for Danish Patent Application No. PA201770502, dated Nov. 10, 2017, 10 pages.
Summons to Attend Oral Proceedings received for European Patent Application No. 12770400.5, mailed on Mar. 19, 2018, 10 pages.
Summons to Attend Oral Proceedings received for European Patent Application No. 17799904.2, mailed on Dec. 20, 2021, 8 pages.
Summons to Attend Oral Proceedings received for European Patent Application No. 17813737.8, mailed on Jan. 4, 2022, 12 pages.
Summons to Attend Oral Proceedings received for European Patent Application No. 18208881.5, mailed on Jun. 29, 2022, 9 pages.
Summons to Attend Oral Proceedings received for European Patent Application No. 19150528.8, mailed on Mar. 15, 2022, 7 pages.
Supplemental Notice of Allowance received for U.S. Appl. No. 15/884,195, dated Dec. 16, 2021, 3 pages.
Wikipedia, "QR code", Available online at: https://en.wikipedia.org/w/index.php?title=QR_code&oldid=452939488, Sep. 28, 2011, pp. 1-9.
Applicant-Initiated Interview Summary received for U.S. Appl. No. 17/076,694, dated Nov. 1, 2022, 3 pages.
Applicant-Initiated Interview Summary received for U.S. Appl. No. 17/321,006, dated Jan. 3, 2023, 4 pages.
Brief Communication Regarding Oral Proceedings received for European Patent Application No. 17799904.2, mailed on Sep. 13, 2022, 1 page.
Brief Communication Regarding Oral Proceedings received for European Patent Application No. 17813737.8, mailed on Sep. 19, 2022, 1 page.
Brief Communication Regarding Oral Proceedings received for European Patent Application No. 19150528.8, mailed on Sep. 5, 2022, 2 pages.
Decision to Refuse received for European Patent Application No. 17799904.2, dated Sep. 19, 2022, 4 pages.
Decision to Refuse received for European Patent Application No. 17813737.8, dated Sep. 30, 2022, 5 pages.
Decision to Refuse received for European Patent Application No. 18208881.5, dated Dec. 23, 2022, 12 pages.
Decision to Refuse received for European Patent Application No. 19150528.8, dated Sep. 9, 2022, 4 pages.
Extended European Search Report received for European Patent Application No. 22188377.0, dated Oct. 27, 2022, 8 pages.
Extended European Search Report received for European Patent Application No. 22198071.7, dated Dec. 5, 2022, 8 pages.
International Preliminary Report on Patentability received for PCT Patent Application No. PCT/US2021/037949, dated Jan. 5, 2023, 13 pages.
International Search Report and Written Opinion received for PCT Patent Application No. PCT/US2022/043863, dated Dec. 14, 2022, 13 pages.
Minutes of Oral Proceedings received for European Patent Application No. 18208881.5, mailed on Dec. 22, 2022, 4 pages.
Non-Final Office Action received for U.S. Appl. No. 17/076,694, dated Sep. 16, 2022, 16 pages.
Non-Final Office Action received for U.S. Appl. No. 17/320,900, dated Dec. 22, 2022, 30 pages.
Non-Final Office Action received for U.S. Appl. No. 17/321,006, dated Nov. 1, 2022, 10 pages.
Notice of Acceptance received for Australian Patent Application No. 2021290334, dated Feb. 8, 2023, 3 pages.
Notice of Allowance received for Korean Patent Application No. 10-2022-7019902, dated Oct. 28, 2022, 8 pages (2 pages of English Translation and 6 pages of Official Copy).
Notice of Allowance received for U.S. Appl. No. 17/076,694, dated Mar. 6, 2023, 12 pages.
Notice of Allowance received for U.S. Appl. No. 17/321,006, dated Mar. 9, 2023, 8 pages.
Notice of Allowance received for U.S. Appl. No. 17/519,025, dated Mar. 2, 2023, 8 pages.
Office Action received for Australian Patent Application No. 2021290334, dated Oct. 26, 2022, 3 pages.
Office Action received for Chinese Patent Application No. 202210023470.4, dated Sep. 5, 2022, 12 pages (6 pages of English Translation and 6 pages of Official Copy).
Office Action received for European Patent Application No. 20204436.8, dated Sep. 21, 2022, 4 pages.
Office Action received for Japanese Patent Application No. 2020-184605, dated Dec. 12, 2022, 9 pages (4 pages of English Translation and 5 pages of Official Copy).
Office Action received for Japanese Patent Application No. 2021-157213, dated Oct. 28, 2022, 10 pages (5 pages of English Translation and 5 pages of Official Copy).
Office Action received for Korean Patent Application No. 10-2023-7003678, dated Feb. 15, 2023, 6 pages (2 pages of English Translation and 4 pages of Official Copy).
Result of Consultation received for European Patent Application No. 18208881.5, mailed on Dec. 6, 2022, 10 pages.
Summons to Attend Oral Proceedings received for European Patent Application No. 18730556.0, mailed on Oct. 13, 2022, 6 pages.

(56) References Cited

OTHER PUBLICATIONS

Applicant-Initiated Interview Summary received for U.S. Appl. No. 17/320,900, dated Apr. 17, 2023, 4 pages.
Extended European Search Report received for European Patent Application No. 23157906.1, dated Apr. 6, 2023, 10 pages.
Notice of Allowance received for Chinese Patent Application No. 202210023470.4, dated Mar. 22, 2023, 3 pages (2 pages of English Translation and 1 page of Official Copy).
105354034 CN A, Cited by the Chinese Patent Office in an Office Action for related Patent Application No. 202210023470.4 dated Sep. 5, 2022.
2006-222531 JP A, Cited by Japanese Patent Office in an Office Action for related Patent Application No. 2021-157213 dated Oct. 28, 2022.
2012-113600 JP A, Cited by Japanese Patent Office in an Office Action for related Patent Application No. 2021-157213 dated Oct. 28, 2022.

\* cited by examiner

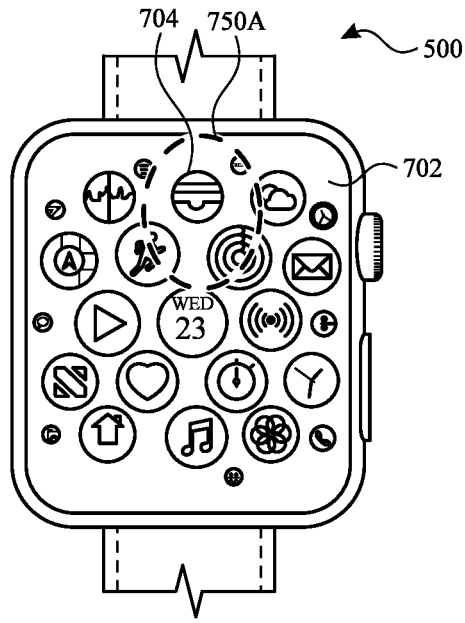
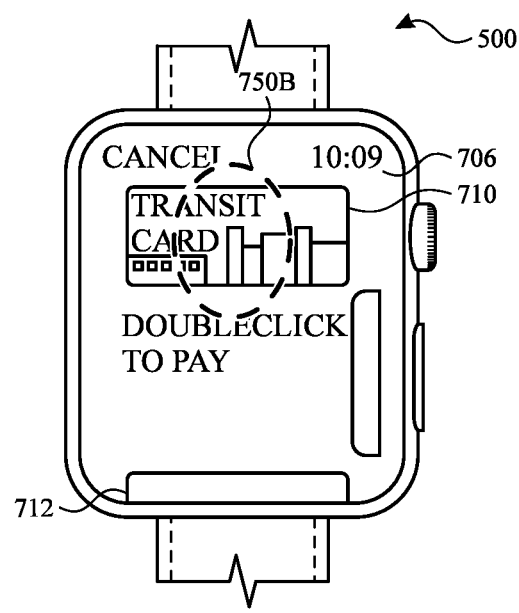
*FIG. 7A*  *FIG. 7B*
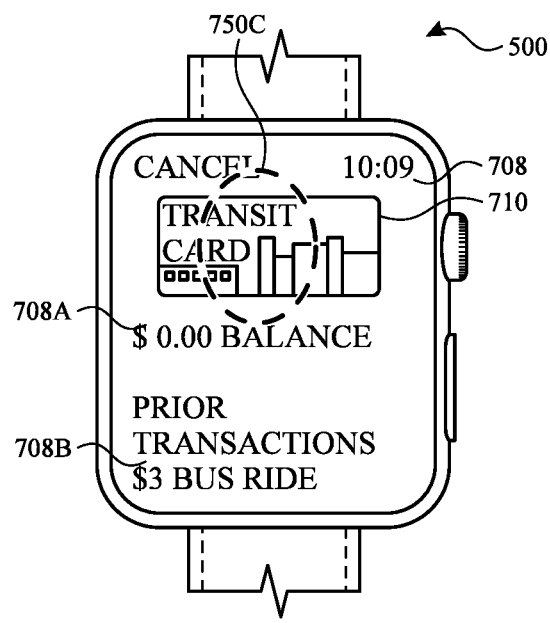
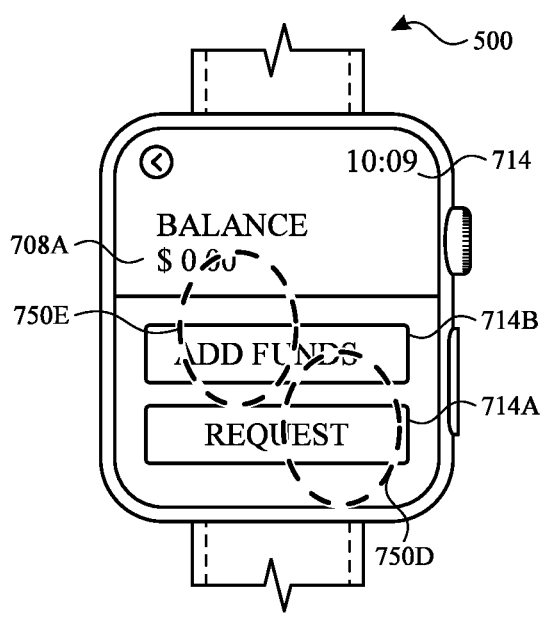
*FIG. 7C*  *FIG. 7D*

800

802
While the first user account is logged in at the computer system, receiving, via the one or more input devices, a request to add assets to an asset account that is associated with the computer system.

804
In response to receiving the request to add assets, displaying, via the display generation component, a preview of a message, wherein the message is prepopulated with:

806
Contact information for the second user account that designates the second user account as the recipient of the message.

808
A user-interactive graphical user interface object, that, when selected at the external computer system, initiates a process to add assets to the asset account.

FIG. 8

REQUESTS TO ADD ASSETS TO AN ASSET ACCOUNT

CROSS REFERENCE TO RELATED APPLICATIONS

This application claims priority to: U.S. Provisional Application Ser. No. 63/246,288, entitled "REQUESTS TO ADD ASSETS TO AN ASSET ACCOUNT," filed Sep. 20, 2021; and U.S. Provisional Application Ser. No. 63/345,343, entitled "REQUESTS TO ADD ASSETS TO AN ASSET ACCOUNT," filed May 24, 2022, the contents of each of which are hereby incorporated by reference in their entirety.

FIELD

The present disclosure relates generally to computer user interfaces, and more specifically to techniques for requesting the addition of assets to an asset account.

BACKGROUND

Assets accounts can be provisioned onto computer systems. For example, an asset account can include printing assets that enable a user to perform print operations. For another example, an asset account can include photo assets that enable a user to store photos. Such assets accounts may need to be replenished with assets so that the user of the computer system can continue to use the account.

BRIEF SUMMARY

Some techniques for requesting the addition of assets to an asset account using electronic devices, however, are generally cumbersome and inefficient. For example, some existing techniques use a complex and time-consuming user interface, which may include multiple key presses or keystrokes. Some technique do not enable a user to request assets from a different user, or require the user to provide user inputs to specify the user from which assets should be requested. Existing techniques require more time than necessary, wasting user time and device energy. This latter consideration is particularly important in battery-operated devices.

Accordingly, the present technique provides electronic devices with faster, more efficient methods and interfaces for requesting the addition of assets to an asset account. Such methods and interfaces optionally complement or replace other methods for requesting the addition of assets to an asset account. Such methods and interfaces reduce the number of inputs required, reduce the cognitive burden on a user, and produce a more efficient human-machine interface. For battery-operated computing devices, such methods and interfaces conserve power and increase the time between battery charges.

In accordance with some embodiments, a method is disclosed. The method is performed at a computer system that is in communication with a display generation component and one or more input devices and is associated with a first user account and a second user account, wherein the second user account is associated with an external computer system. The method comprises: while the first user account is logged in at the computer system, receiving, via the one or more input devices, a request to add assets to an asset account that is associated with the computer system; and in response to receiving the request to add assets, displaying, via the display generation component, a preview of a message, wherein the message is prepopulated with: contact information for the second user account that designates the second user account as the recipient of the message; and a user-interactive graphical user interface object, that, when selected at the external computer system, initiates a process to add assets to the asset account.

In accordance with some embodiments, a non-transitory computer-readable storage medium is disclosed. The non-transitory computer-readable storage medium stores one or more programs configured to be executed by one or more processors of a computer system that is in communication with a display generation component and one or more input devices and is associated with a first user account and a second user account, wherein the second user account is associated with an external computer system, the one or more programs including instructions for: while the first user account is logged in at the computer system, receiving, via the one or more input devices, a request to add assets to an asset account that is associated with the computer system; and in response to receiving the request to add assets, displaying, via the display generation component, a preview of a message, wherein the message is prepopulated with: contact information for the second user account that designates the second user account as the recipient of the message; and a user-interactive graphical user interface object, that, when selected at the external computer system, initiates a process to add assets to the asset account.

In accordance with some embodiments, a transitory computer-readable storage medium is disclosed. The transitory computer-readable storage medium stores one or more programs configured to be executed by one or more processors of a computer system that is in communication with a display generation component and one or more input devices and is associated with a first user account and a second user account, wherein the second user account is associated with an external computer system, the one or more programs including instructions for: while the first user account is logged in at the computer system, receiving, via the one or more input devices, a request to add assets to an asset account that is associated with the computer system; and in response to receiving the request to add assets, displaying, via the display generation component, a preview of a message, wherein the message is prepopulated with: contact information for the second user account that designates the second user account as the recipient of the message; and a user-interactive graphical user interface object, that, when selected at the external computer system, initiates a process to add assets to the asset account.

In accordance with some embodiments, a computer system is disclosed. The computer system is configured to communicate with a display generation component and one or more input devices and is associated with a first user account and a second user account, wherein the second user account is associated with an external computer system, comprising: one or more processors; and memory storing one or more programs configured to be executed by the one or more processors, the one or more programs including instructions for: while the first user account is logged in at the computer system, receiving, via the one or more input devices, a request to add assets to an asset account that is associated with the computer system; and in response to receiving the request to add assets, displaying, via the display generation component, a preview of a message, wherein the message is prepopulated with: contact information for the second user account that designates the second user account as the recipient of the message; and a user-interactive graphical user interface object, that, when selected at the external computer system, initiates a process to add assets to the asset account.

In accordance with some embodiments, a computer system is disclosed. The computer system is configured to communicate with a display generation component and one or more input devices and is associated with a first user account and a second user account, wherein the second user account is associated with an external computer system, comprising: means, while the first user account is logged in at the computer system, for receiving, via the one or more input devices, a request to add assets to an asset account that is associated with the computer system; and means, responsive to receiving the request to add assets, for displaying, via the display generation component, a preview of a message, wherein the message is prepopulated with: contact information for the second user account that designates the second user account as the recipient of the message; and a user-interactive graphical user interface object, that, when selected at the external computer system, initiates a process to add assets to the asset account.

In accordance with some embodiments, a computer program product is disclosed. The computer program product comprises one or more programs configured to be executed by one or more processors of a computer system that is in communication with a display generation component and one or more input devices and is associated with a first user account and a second user account, wherein the second user account is associated with an external computer system, the one or more programs including instructions for: while the first user account is logged in at the computer system, receiving, via the one or more input devices, a request to add assets to an asset account that is associated with the computer system; and in response to receiving the request to add assets, displaying, via the display generation component, a preview of a message, wherein the message is prepopulated with: contact information for the second user account that designates the second user account as the recipient of the message; and a user-interactive graphical user interface object, that, when selected at the external computer system, initiates a process to add assets to the asset account.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for requesting the addition of assets to an asset account, thereby increasing the effectiveness, efficiency, and user satisfaction with such devices. Such methods and interfaces may complement or replace other methods for requesting the addition of assets to an asset account.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 8 is a flow diagram illustrating methods of requesting assets be added to an asset account, in accordance with some embodiments.

DESCRIPTION OF EMBODIMENTS

Figure 1A:
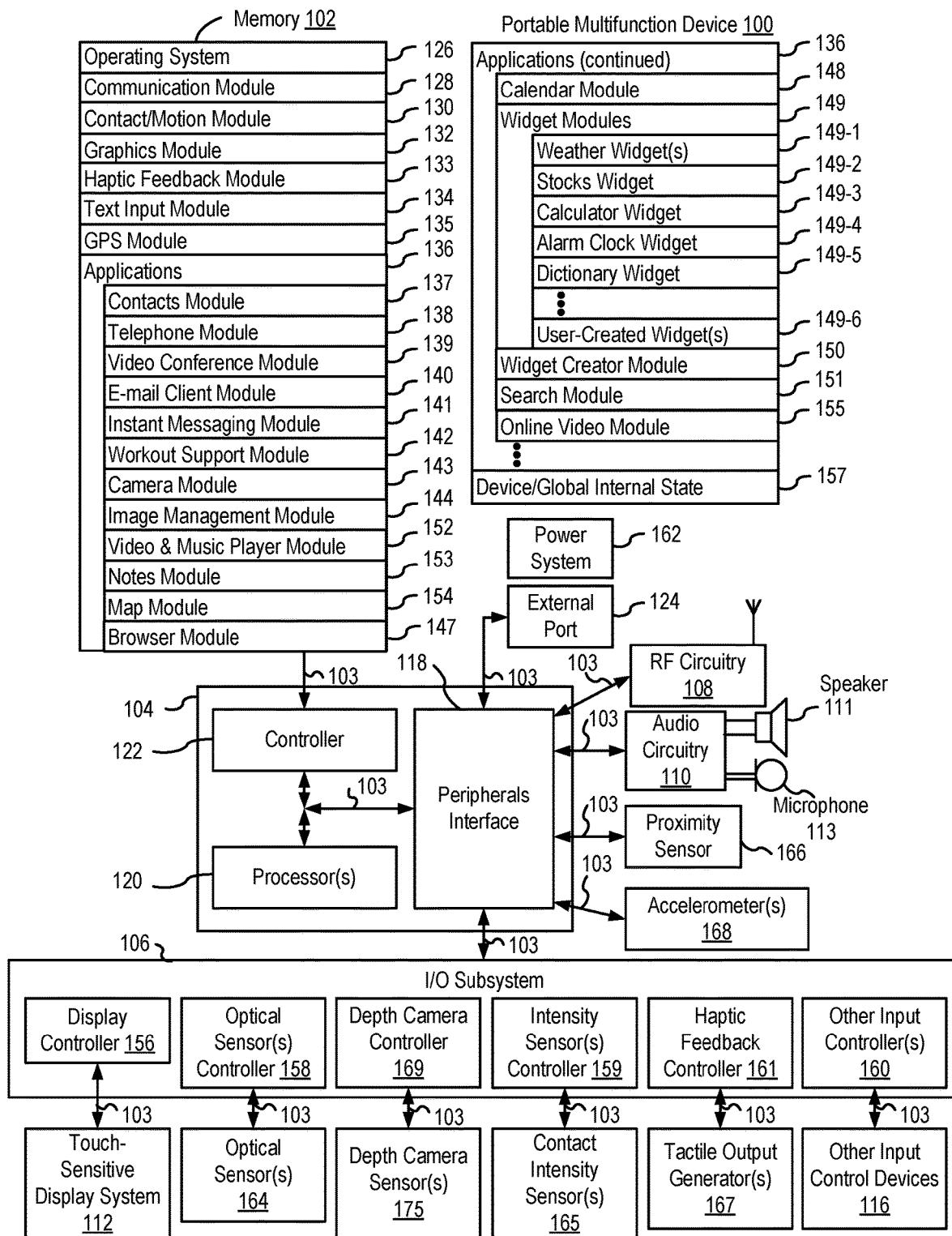
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for adding assets to an asset account. Such techniques can reduce the cognitive burden on a user who requests assets and/or adds assets to an asset account, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for adding assets to an asset account. FIGS. 6A-6C illustrate exemplary user interfaces for requesting assets be added to an asset account. FIGS. 7A-7O illustrate exemplary user interfaces for requesting assets be added to an asset account. FIG. 8 is a flow diagram illustrating methods of requesting assets be added to an asset account in accordance with some embodiments. The user interfaces in FIGS. 6A-6C and 7A-7O are used to illustrate the processes described below, including the processes in FIG. 8.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
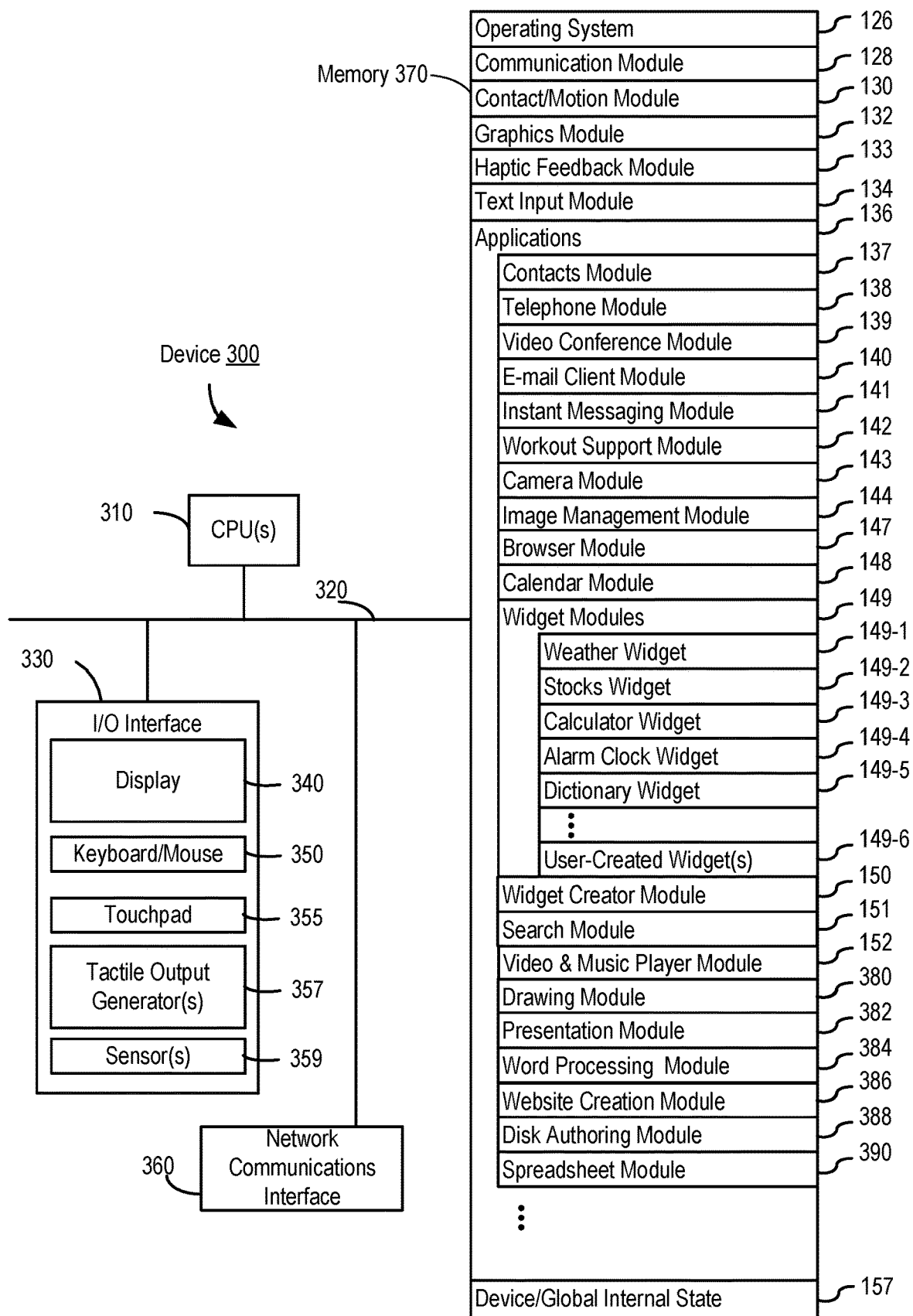
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
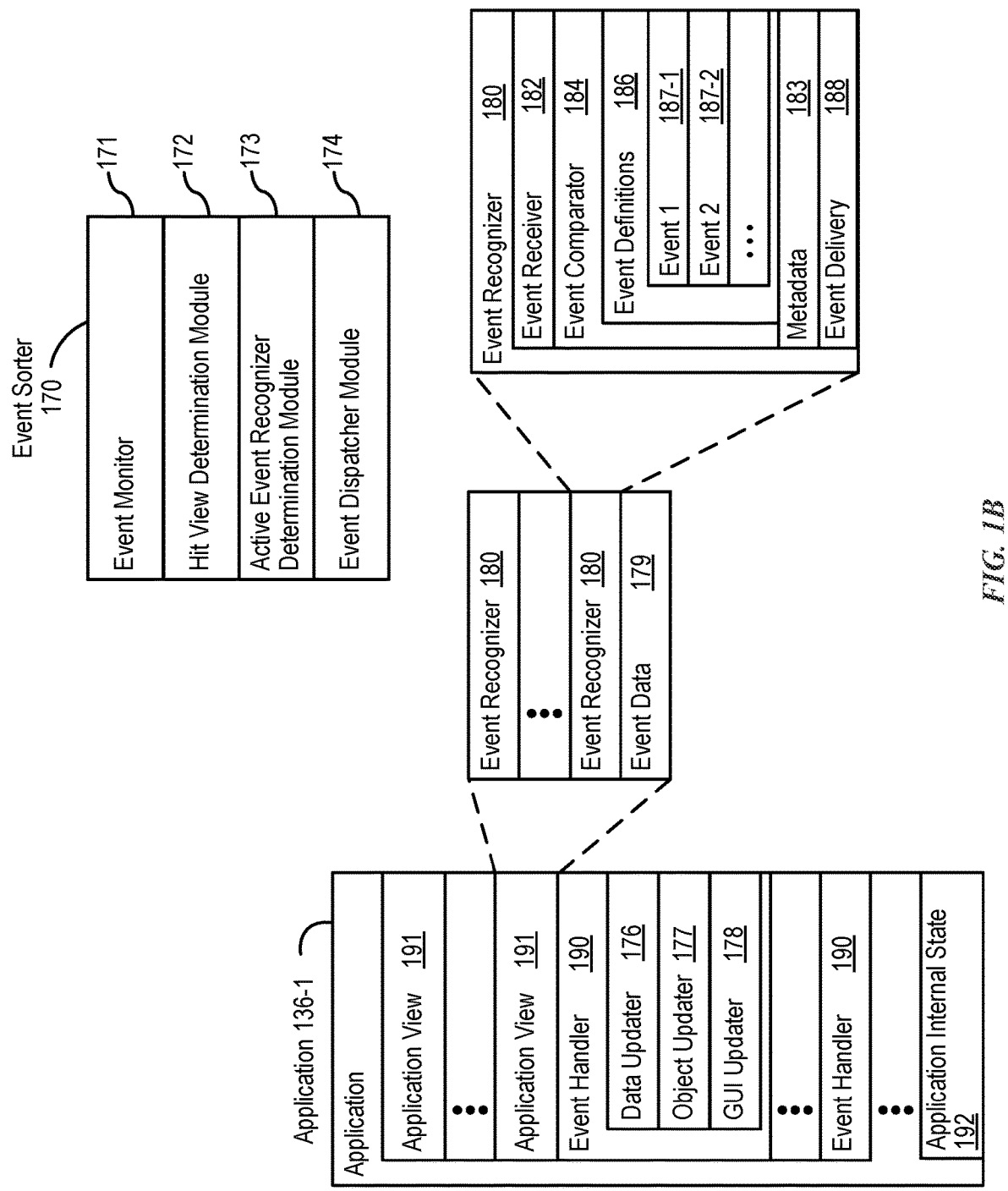
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
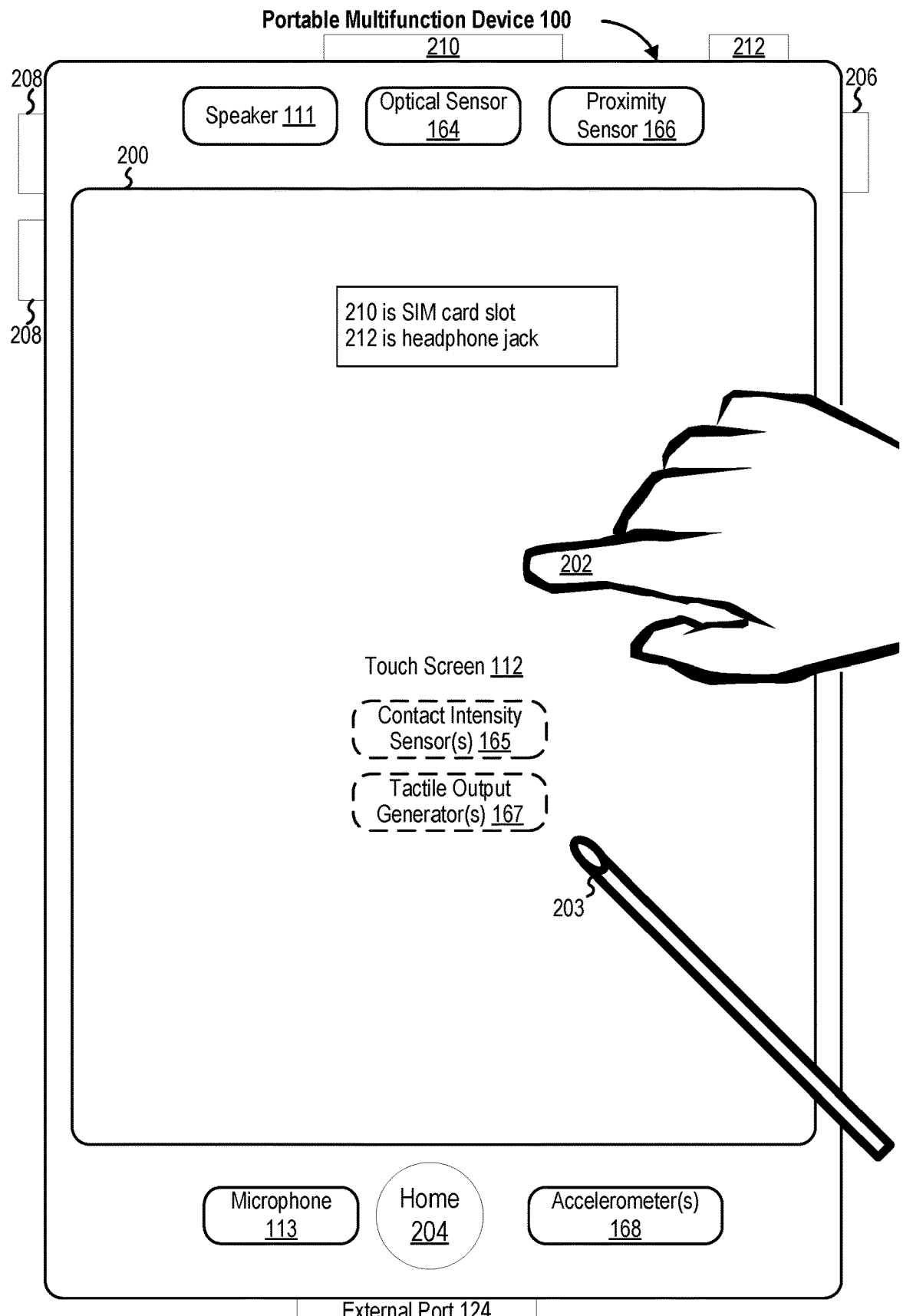
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
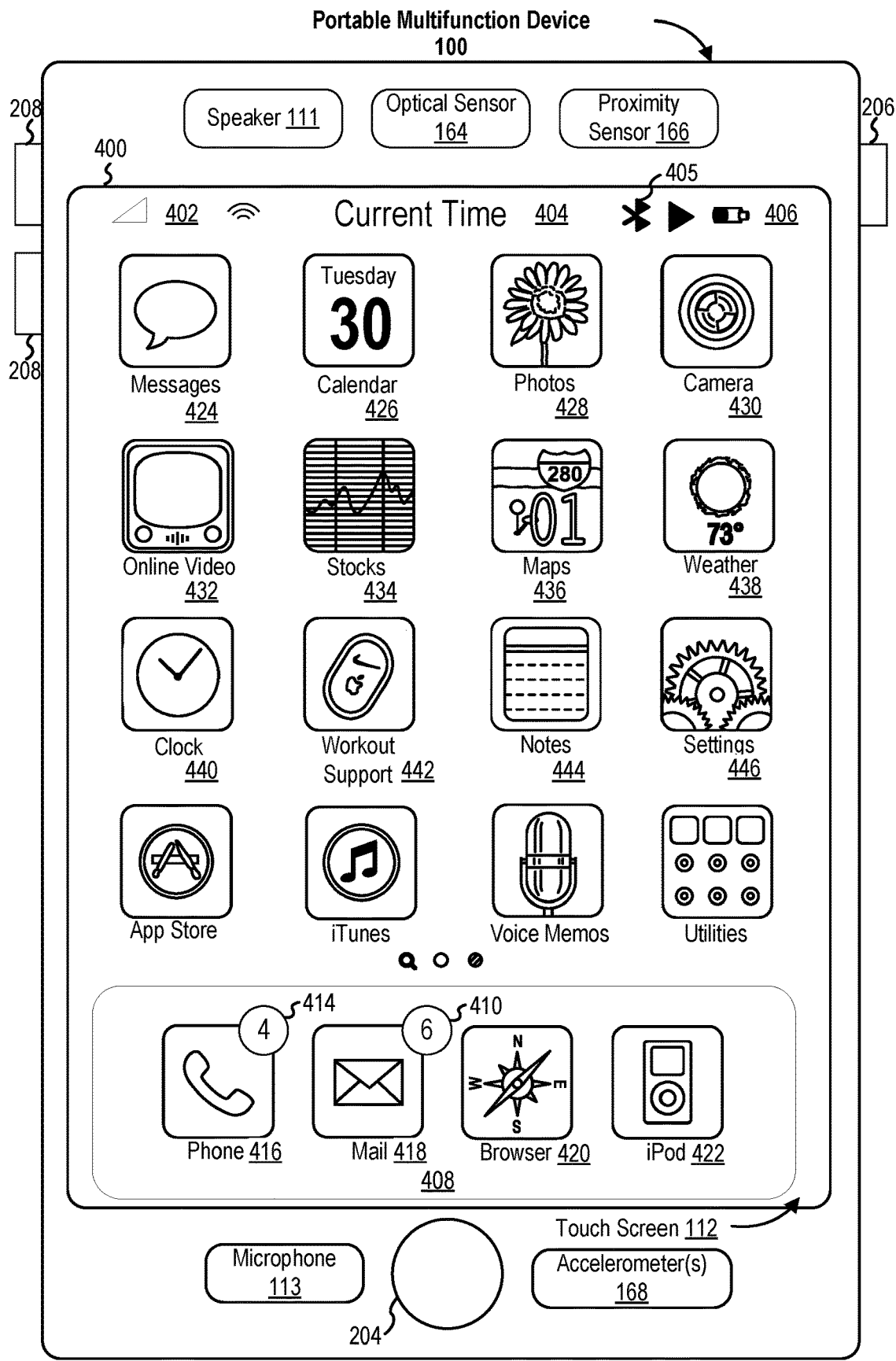
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
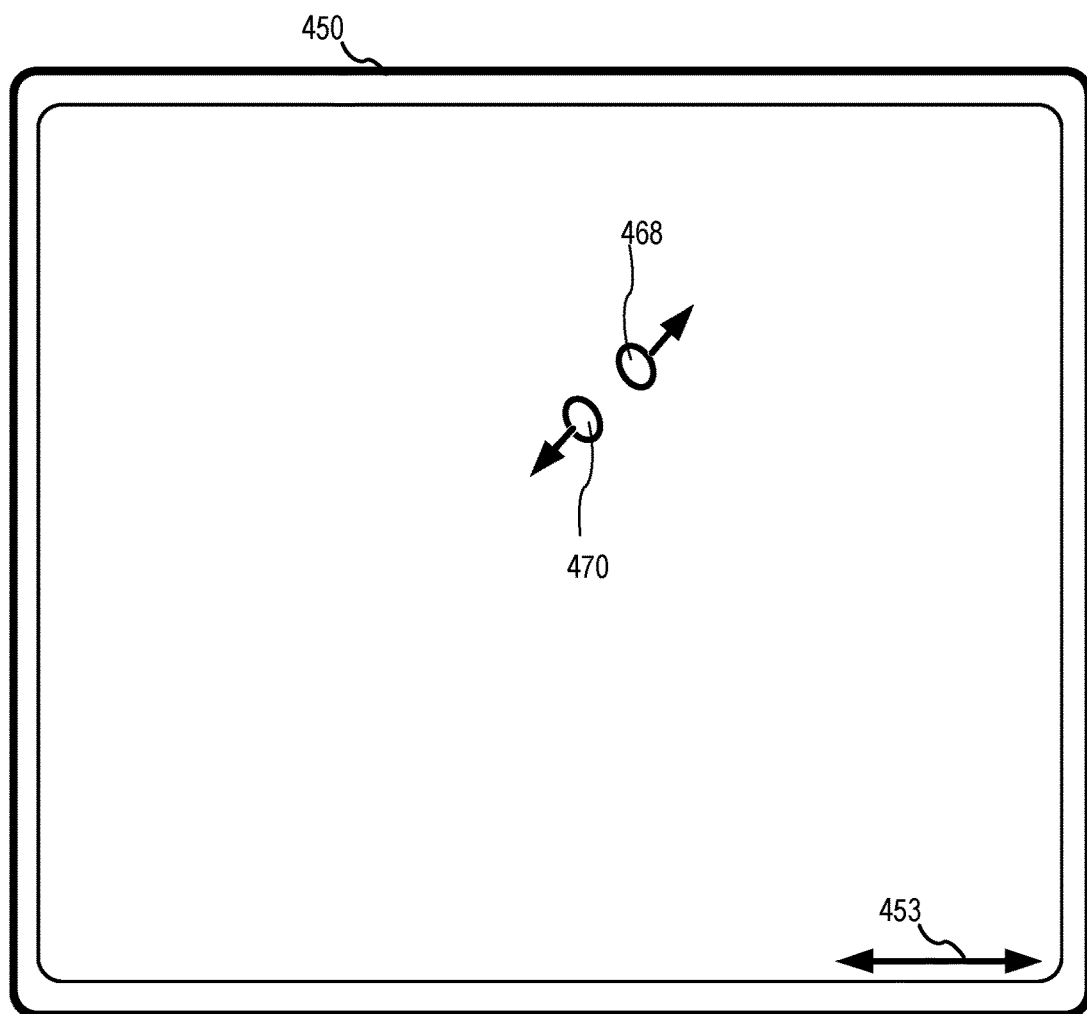
FIG. 4B illustrates an exemplary user interface for a multifunction device with a touch-sensitive surface that is separate from the display in accordance with some embodiments.
Figure 4B:
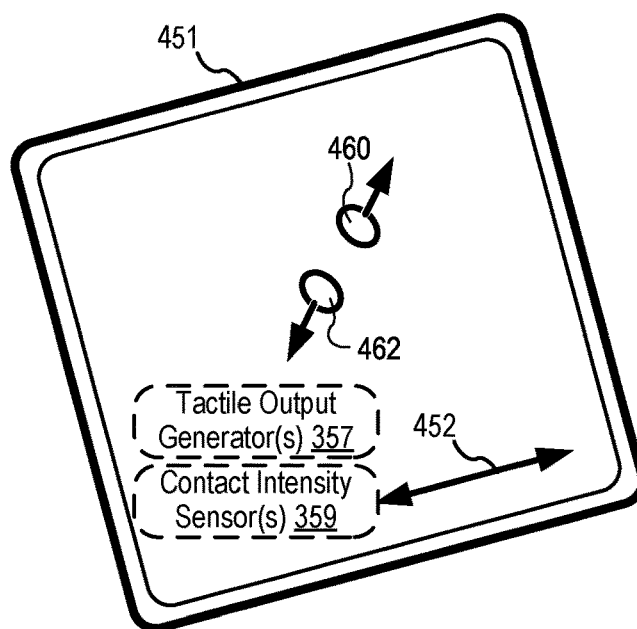

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
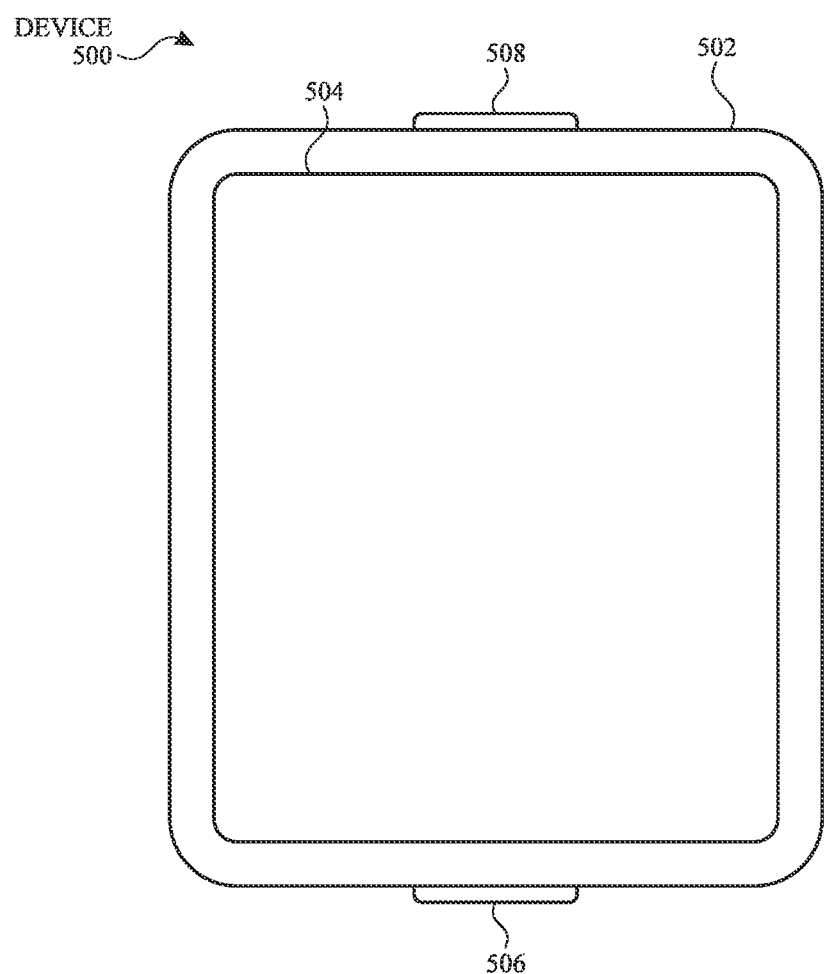
FIG. 5A illustrates a personal electronic device in accordance with some embodiments.
Figure 6A:
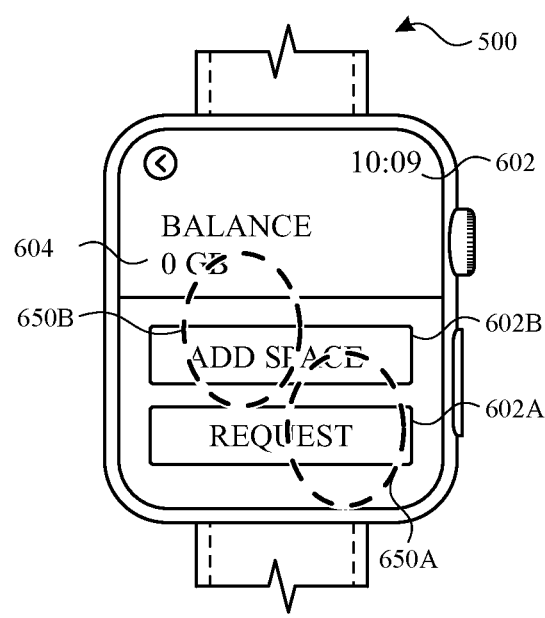
FIGS. 6A-6C illustrate exemplary devices and user interfaces for requesting assets be added to an asset account, in accordance with some embodiments.
Figure 6B:
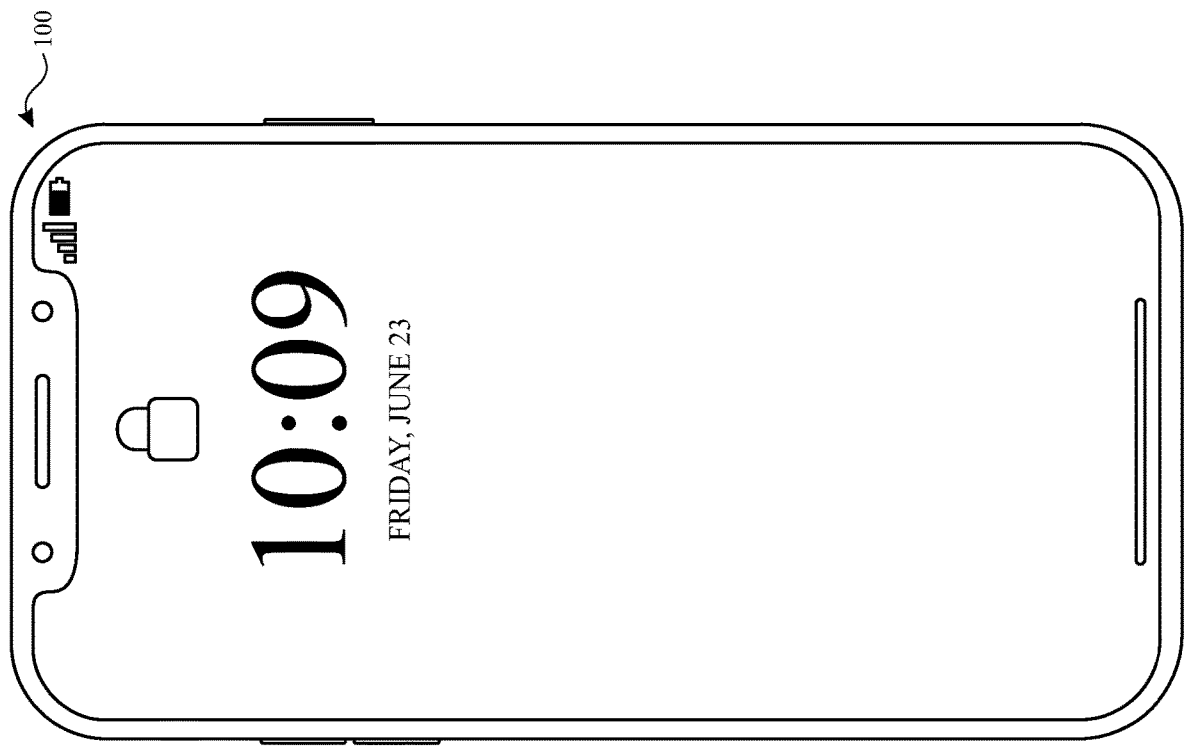
Figure 6B:
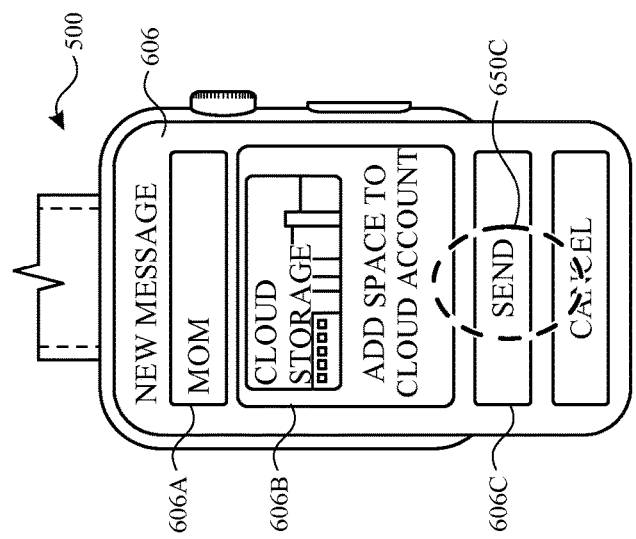
Figure 6C:
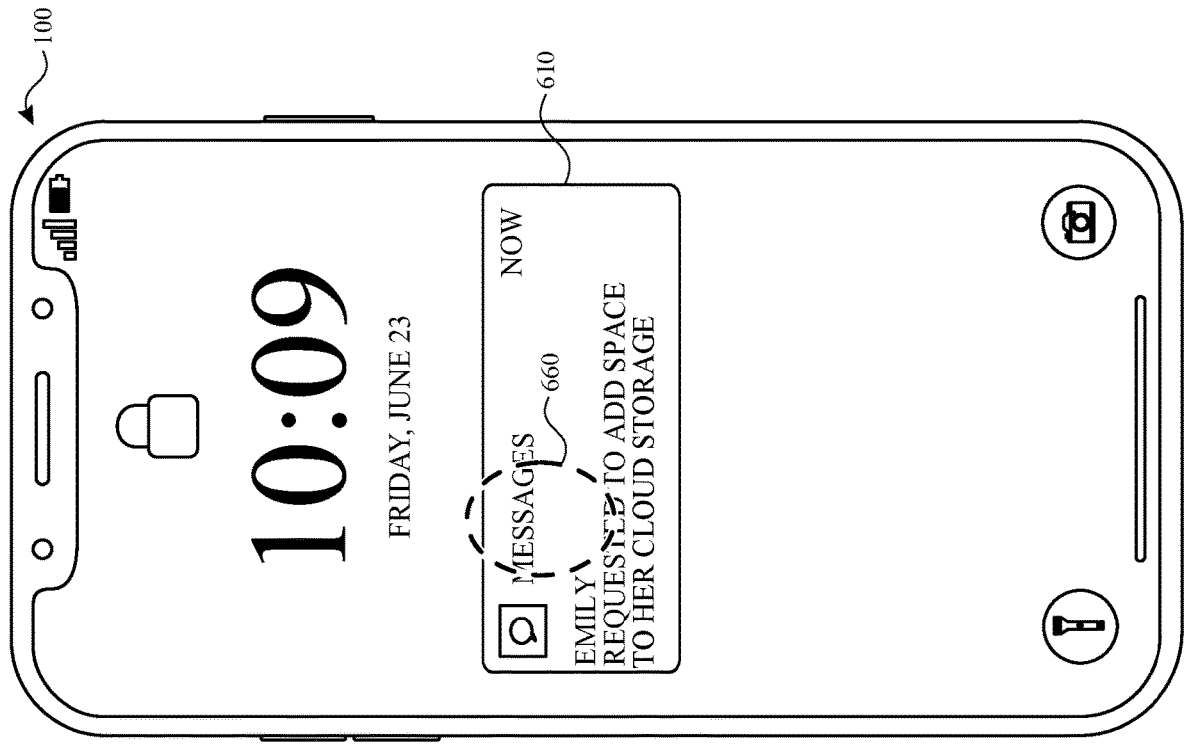
Figure 6C:
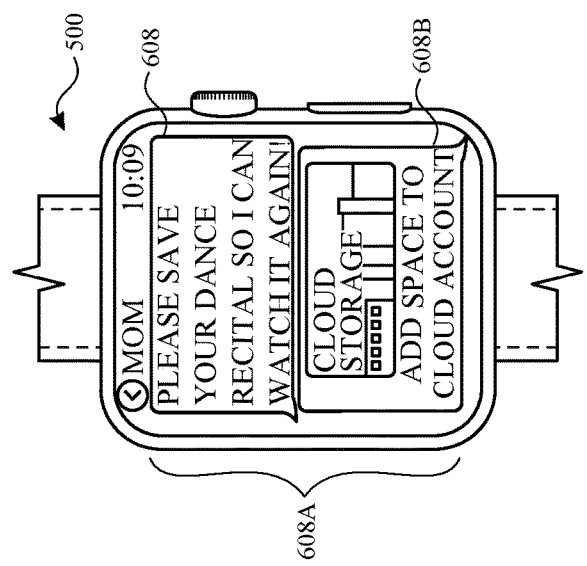

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
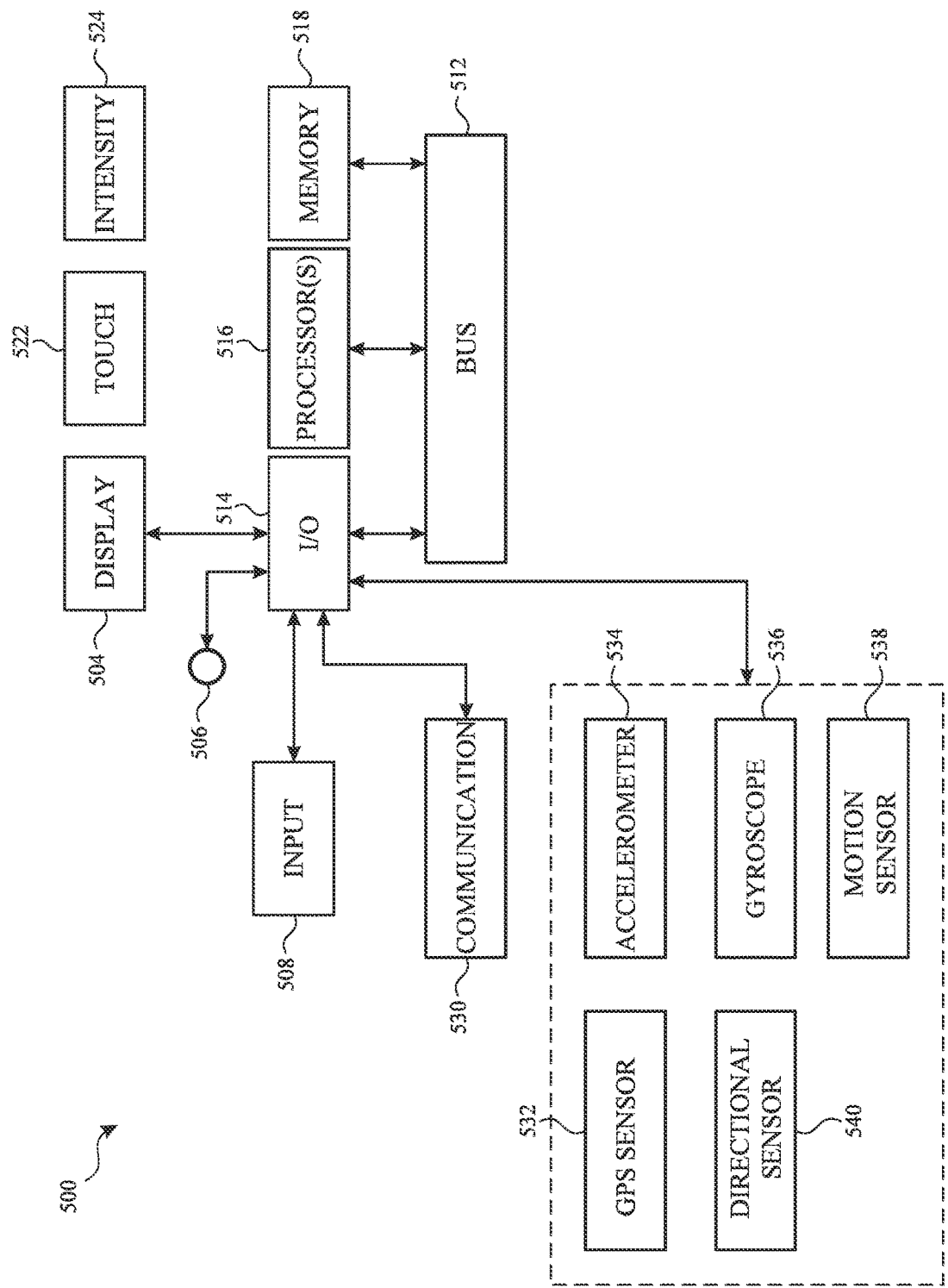
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 800 (FIG. 8). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6C illustrate exemplary user interfaces for requesting assets be added to an asset account, in accordance with some embodiments. The user interfaces in these figures are used to illustrate the processes described below, including the processes in FIG. 8. At FIG. 6A, computer system 500 is displaying user interface 602, which displays information about an asset account. Computer system 500 is not associated with (e.g., not paired with) a phone (e.g., a smart phone). For example, computer system 500 is being used by a child (or dependent) that does not have a phone and the child is logged into computer system 500 using the child's user account. Computer system 500 is also associated with a user account of a trusted individual, such as a parent (or guardian) of the child. For another example, computer system 500 is being used by an adult that has a phone that is not compatible for pairing with computer system 500 (e.g., computer system 500 and the adult's phone are manufactured by different entities and/or have operating systems provided by different entities) and computer system 500 is associated with a user account of a trusted individual, such as a spouse or other family member of the adult.

At FIG. 6A, user interface 602 includes an indication 604 of the amount of assets associated with (e.g., balance of, available at, stored on, and/or corresponding to) a cloud storage account that is provisioned onto computer system 500. As illustrated in FIG. 6A, the cloud storage account has no space available and therefore cannot be used to store additional data, such as a new video file. At FIG. 6A, user interface 602 includes request option 602A, on which computer system 500 detects input 650A (e.g., a tap input). In response to detecting input 650A on request option 602A, user interface 606 is displayed, as shown in FIG. 6B. User interface 602 optionally includes add space option 602B, on which computer system 500 detects input 650B (e.g., a tap input).

FIG. 6B illustrates both computer system 500 of the child and device 100 (also referred to as computer system 100) of the parent/guardian. In response to input 650A on request option 602A, computer system 500 displays user interface 606, which includes a preview of a message (e.g., a text message, an email message) that can be transmitted to the parent/guardian to request storage space be added to the cloud storage account. The message preview is prepopulated with contact information 606A (e.g., a phone number and/or email address) for the parent/guardian and a graphical user interface object 606B. When selected at device 100 (e.g., selected in a messaging application of the external computer system), graphical user interface object 606B initiates a process to add space to the cloud storage account. In some embodiments, computer system 500 receives additional text to include in the message (e.g., "I am out of storage space"). As illustrated in FIG. 6B, contact information 606A for the child's mom (the user of computer system 100) and graphical user interface object 606B are prepopulated in the message. At FIG. 6B, computer system 500 detects input 650C (e.g., a tap input) on send option 606C, which transmits the message to the parent/guardian and causes display of user interface 608, as shown in FIG. 6C.

At FIG. 6C, after transmitting message 608B, computer system 500 displays message 608B as part of a conversation 608A between the child (e.g., the user of computer system 500) and the parent/guardian (e.g., the user of computer system 100). Also at FIG. 6C, device 100 displays notification 610 indicating that message 608B has been received from the child. In this example, notification 610 provides an indication of the sender (e.g., the child named "Emily") and an indication that the message is a request for the parent/guardian to transfer storage space to the child's cloud storage account. The child's cloud storage account is not provisioned onto computer system 100. At FIG. 6C, device 100 detects input 660 (e.g., a tap input by the parent/guardian) on notification 610 that causes device 100 to display the message.

FIGS. 7A-7O illustrate exemplary user interfaces for requesting assets be added to an asset account, in accordance with some embodiments. The user interfaces in these figures are used to illustrate the processes described below, including the processes in FIG. 8.

At FIG. 7A, computer system 500 is displaying user interface 702, which includes icons, which when activated cause display of a corresponding application. Computer system 500 is not associated with (e.g., not paired with) a phone (e.g., a smartphone). For example, computer system 500 is being used by a child (or dependent) that does not have a phone and the child is logged into computer system 500 using the child's user account. Computer system 500 is also associated with a user account of a trusted individual, such as a parent (or guardian) of the child. For another example, computer system 500 is being used by an adult that has a phone that is not compatible for pairing with computer system 500 (e.g., computer system 500 and the adult's phone are manufactured by different entities and/or have operating systems provided by different entities) and computer system 500 is associated with a user account of a trusted individual, such as a spouse or other family member of the adult.

At FIG. 7A, computer system 500 detects input 750A (e.g., a tap input) on icon 704 for a wallet application. In response to detecting input 750A, computer system 500 displays user interface 706, as shown in FIG. 7B. In some embodiments, FIG. 7B is displayed in response to computer system 500 being placed into a communication field (e.g., an NFC field) of a contactless terminal (e.g., an NFC-enabled contactless reader, a point-of-sale terminal) and/or receiving a request for assets (e.g., funds, money, and/or travel credits) from the contactless terminal.

At FIG. 7B, computer system 500 displays representation 710 of a transit account that is provisioned onto computer system 500 and representation 712 of a transfer account provisioned onto computer system 500. Computer system 500 detects input 750B (e.g., a tap input) on representation 710, which causes display of user interface 708, as shown in FIG. 7C.

At FIG. 7C, user interface 708 includes representation 710 of the transit account, indication 708A of the amount of assets associated with (e.g., balance of, available at, stored on, and/or corresponding to) the transit account, and a history of at least some past transactions performed using the transit account, such as bus ride 708B. As illustrated in FIG. 7C, the transit account has no funds and therefore cannot be used to ride the transit, such as a bus. At FIG. 7C, computer system 500 detects input 750C (e.g., a tap input) on representation 710, which causes display of user interface 714, as shown in FIG. 7D.

At FIG. 7D, user interface 714 includes request option 714A and optionally includes add funds option 714B. In some embodiments, add funds option 714B is not displayed, displayed with a different visual appearance (e.g., greyed out), and/or cannot be activated when computer system 500 is not provisioned with an account capable of transferring assets to the transit account. For example, add funds option 714B is not displayed when the transit account is the only asset account provisioned on computer system 500. For another example, add funds option 714B is not displayed when the only other transfer account (e.g., corresponding to representation 712) provisioned on computer system 500 does not have any funds to transfer to the transit account. At FIG. 7D, computer system 500 detects an input (e.g., a tap input) on request option 714A or add funds option 714B. When computer system 500 detects input 750D (e.g., a tap input) on request option 714A, user interface 716 is displayed, as shown in FIG. 7D. When computer system 500 detects input 750E (e.g., a tap input) on add funds option 714B, user interface 722 is displayed, as shown in FIG. 7M.

Figure 7E:
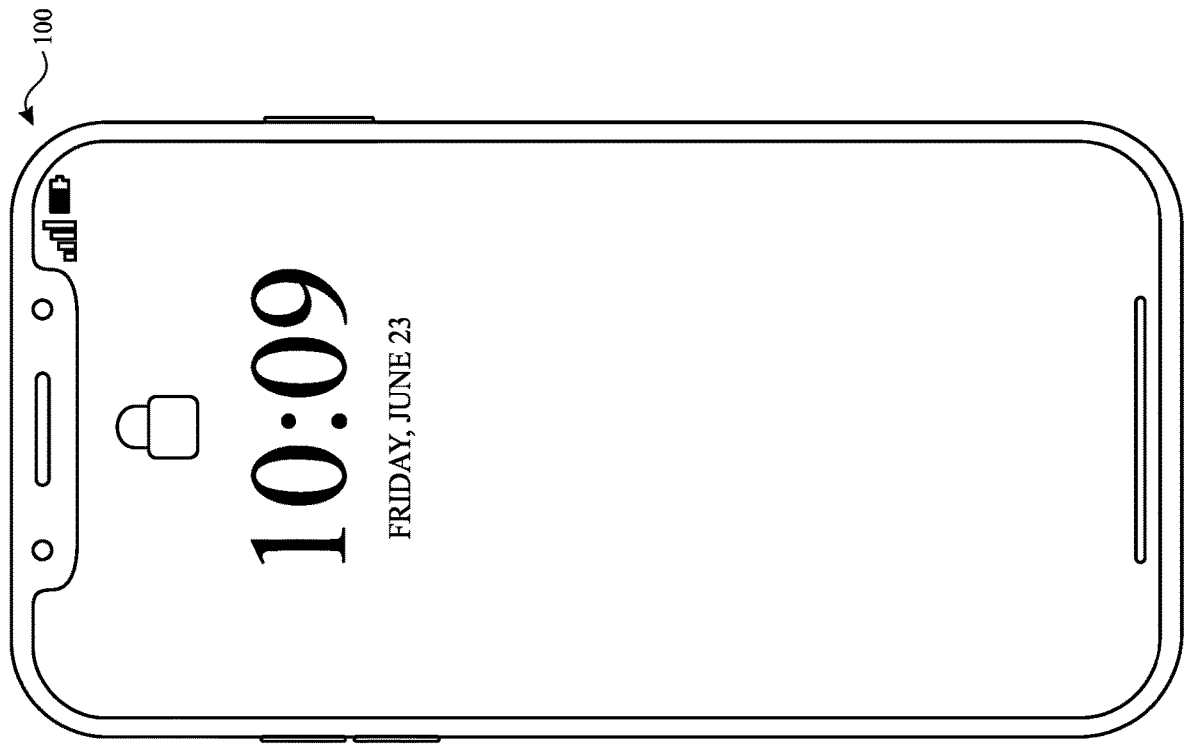
FIGS. 7A-7O illustrate exemplary devices and user interfaces for requesting assets be added to an asset account, in accordance with some embodiments.
Figure 7E:
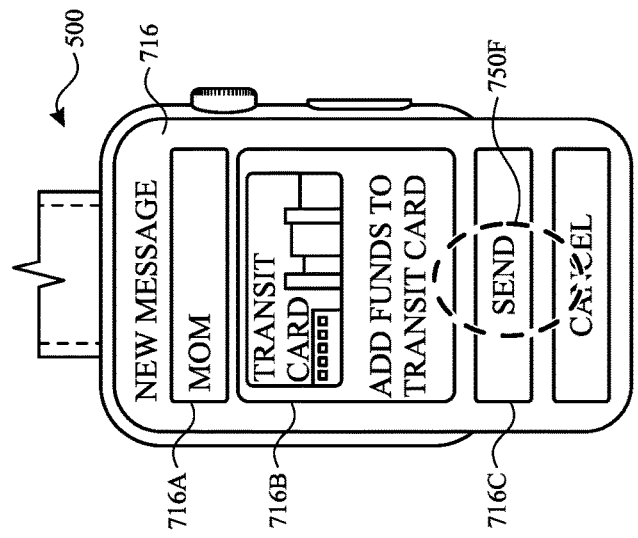

FIG. 7E illustrates both computer system 500 of the child and device 100 (also referred to as computer system 100) of the parent/guardian. In some embodiments, computer system 100 includes one or more features of devices 300 and/or 500. At FIG. 7E, in response to input 750D (e.g., a tap input) on request option 714A, computer system 500 displays a preview of a message (e.g., a text message, an email message) that is prepopulated with contact information (e.g., a phone number and/or email address) for the parent/guardian and a graphical user interface object to send to the parent/guardian, as shown in user interface 716. The message can be transmitted to the parent/guardian to request funds be added to the transit account. As illustrated in FIG. 7E, contact information 716A for the child's mom (the user of computer system 100) and graphical user interface object 716B are prepopulated in the message. Graphical user interface object 716B is an object that, when selected at the parent/guardian's computer system (e.g., selected in a messaging application of the external computer system), initiates a process to add funds to the transit account. In some embodiments, computer system 500 receives additional text to include as part of the message to the parent/guardian (e.g., "I need funds to ride the bus"). The message is optionally not prepopulated with an amount of funds being requested. Computer system 500 detects input 750F (e.g., a tap input) on send option 716C, which transmits the message to the parent/guardian and causes display of user interface 718, as shown in FIG. 7F.

Figure 7F:
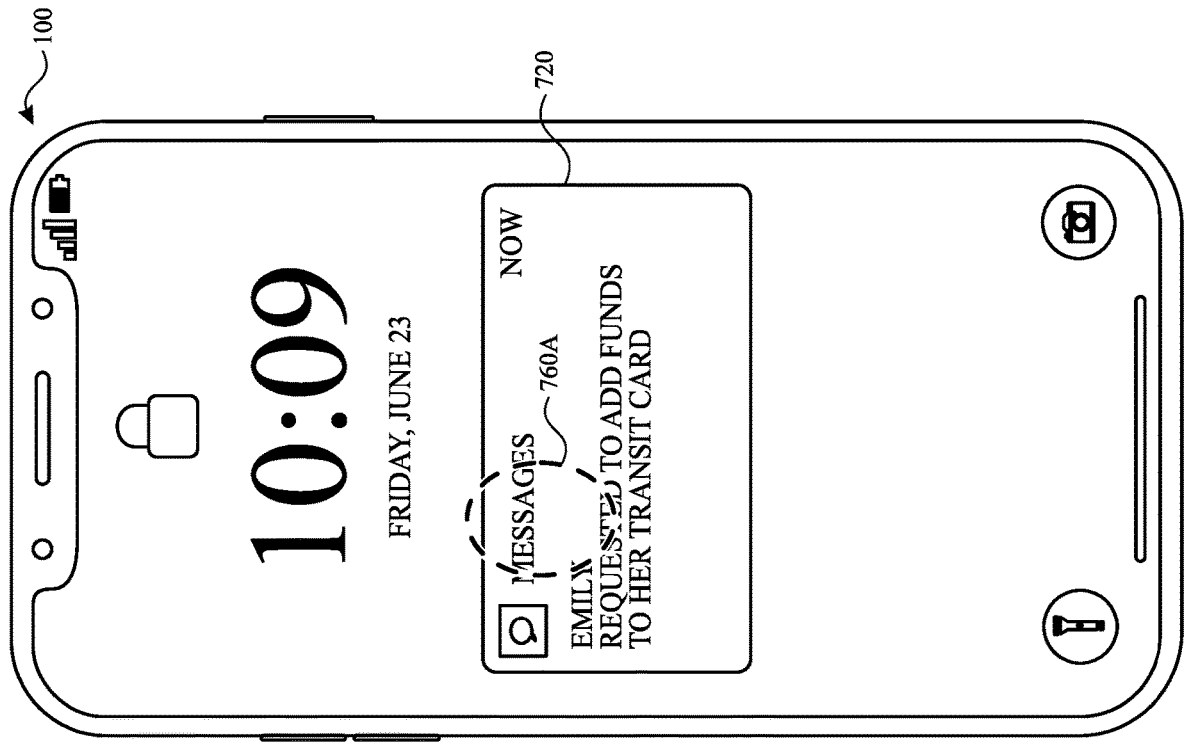
Figure 7F:
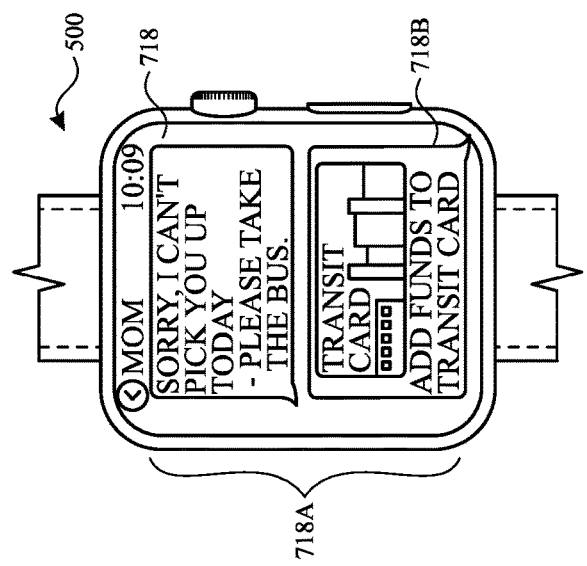

At FIG. 7F, computer system 500 has transmitted the message and displays the message 718B as part of conversation 718A between the user of computer system 500 (e.g., the child) and the parent/guardian (the user of computer system 100). As shown in FIG. 7F, computer system 100 displays notification 720 indicating that message 718B has been received from the child. In this example, notification 720 provides an indication of the sender (e.g., the child named "Emily") and an indication that the message is a request for the parent/guardian to transfer funds to the child's transit account. The child's transit account is not provisioned onto computer system 100. At FIG. 7F, computer system 100 detects an input 760A (e.g., tap input by the parent/guardian) on notification 720 and, in response, displays user interface 770 as shown in FIG. 7G.

Figure 7G:
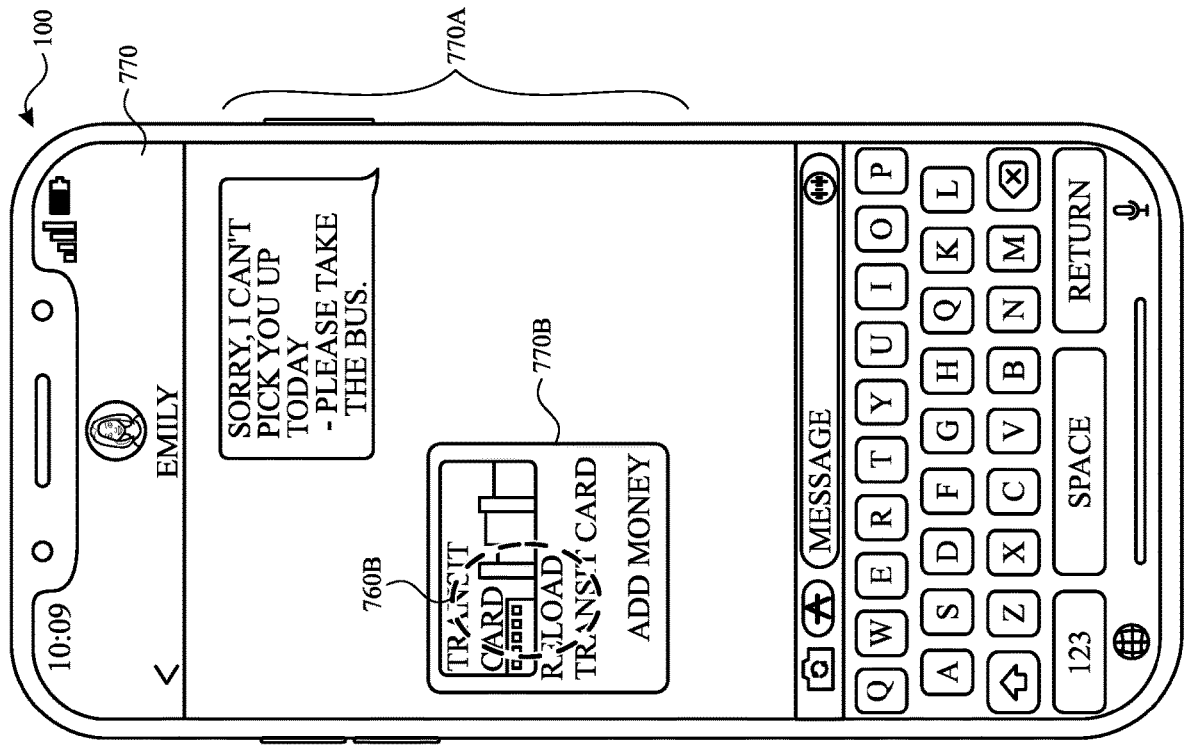
Figure 7G:
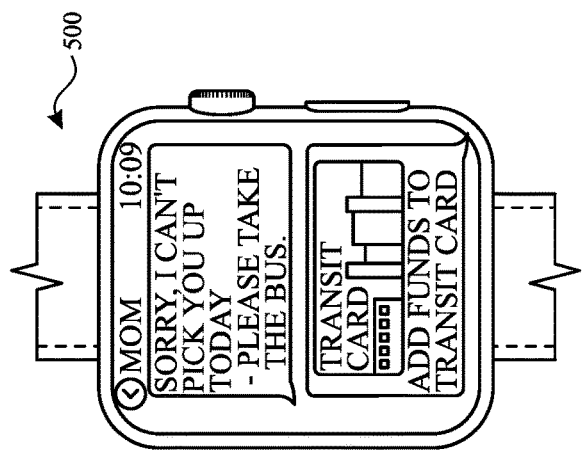
Figure 7H:
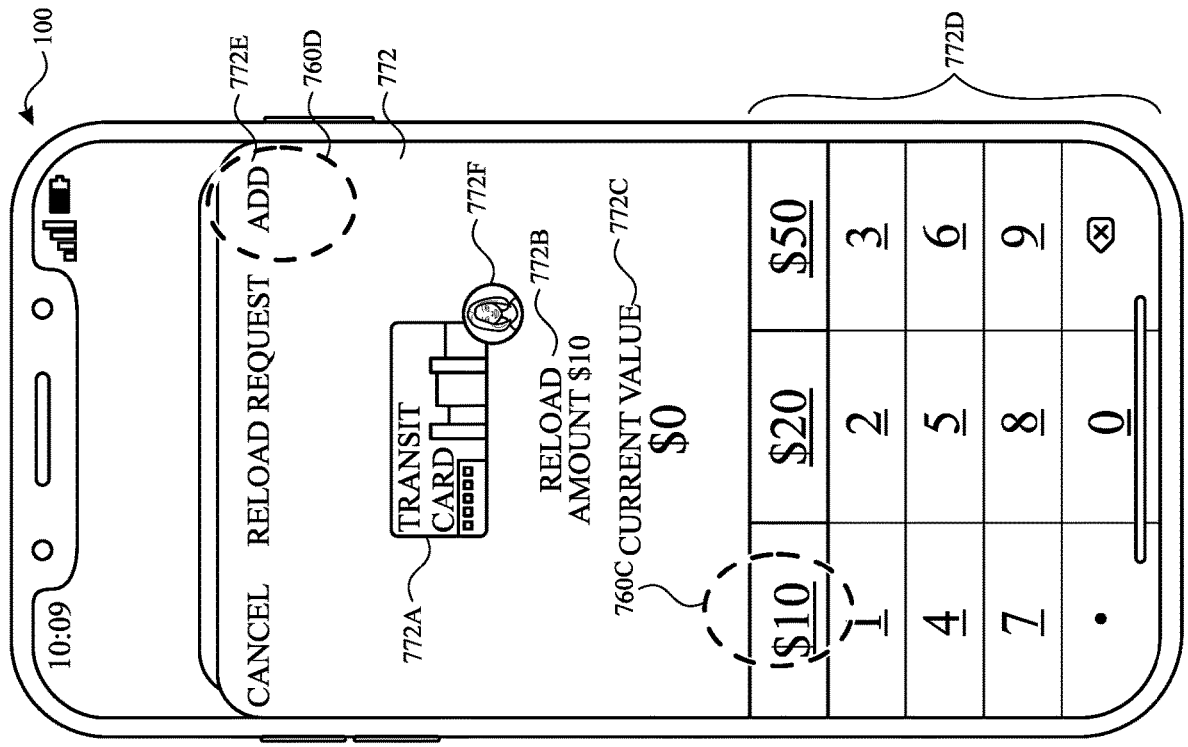
Figure 7H:
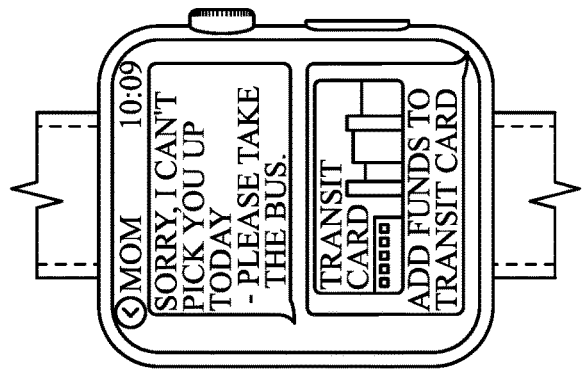
Figure 7I:
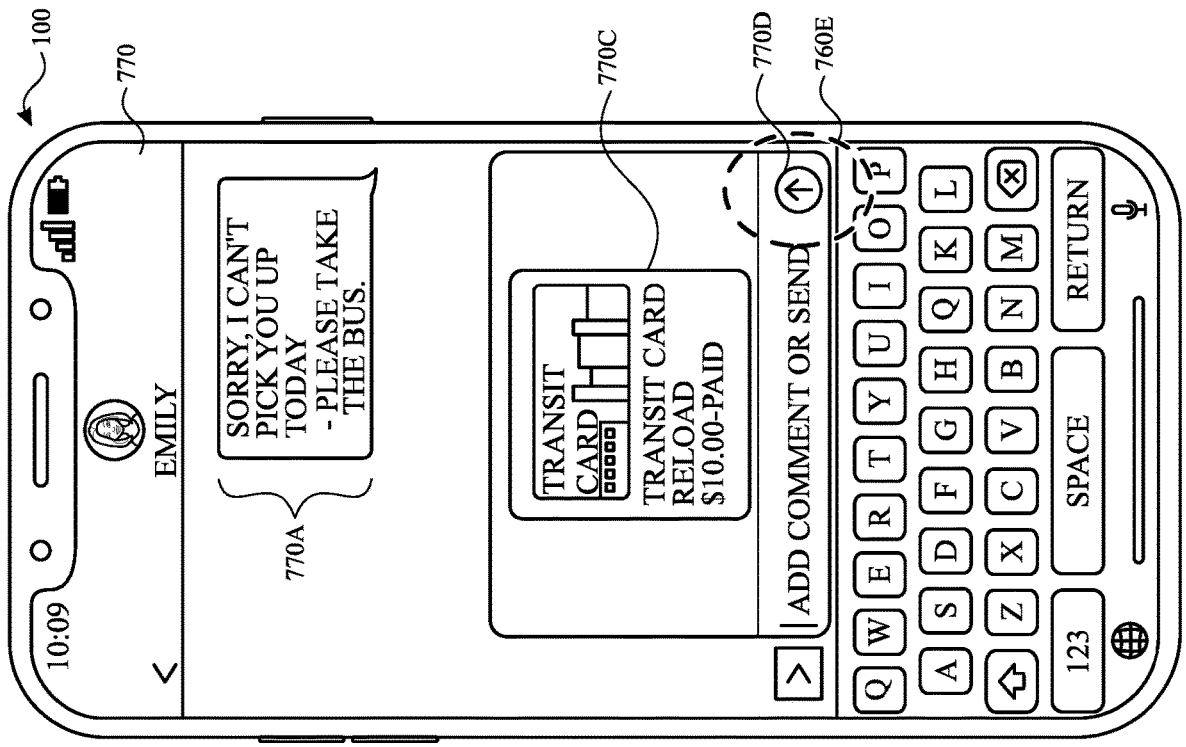
Figure 7I:
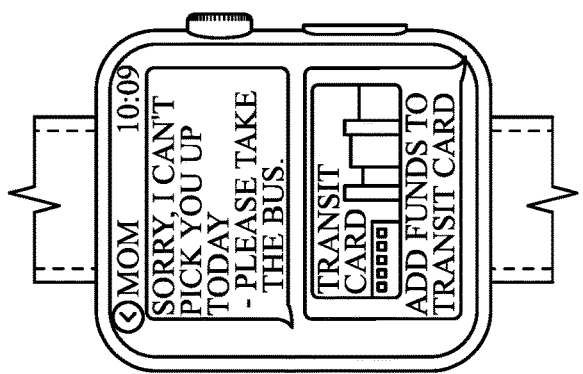

At FIG. 7G, user interface 770 includes conversation 770A between the user of computer system 500 (e.g., the child) and the parent/guardian (the user of computer system 100). Conversation 770A includes graphical user interface object 770B that was received from computer system 500 and that, when selected at the parent/guardian's computer system, initiates a process to add funds to the transit account. At FIG. 7G, computer system 100 detects user input 760B (e.g., a tap input) on graphical user interface object 770B and, in response, displays user interface 772, as shown in FIG. 7H, which includes indication 772A of the transit account, amount 772B of funds to be added to the transit account, amount 772C of funds currently on the transit account, keypad 772D for entering the amount of funds to be added to the transit account, and indication 772F (e.g., an image) of the requesting user (e.g., the child). In this example, indication 772F partially overlays indication 772A of the transit account. At FIG. 7H, computer system 100 has detected input 760C and updated amount 772B to reflect a corresponding value. In response to detecting input 760D on add option 772E, computer system 100 displays conversation 770A and includes a draft message to send to computer system 500 that adds funds to the transit account, as shown in FIG. 7I. In some embodiments, in response to detecting user input 760D, computer system 100 replaces display of message 770B with message 770C in a draft message portion of user interface 770. In some embodiments, in response to detecting user input 760D, computer system 100 changes a visual appearance of message 770B and/or ceases to display message 770B in user interface 770.

Figure 7J:
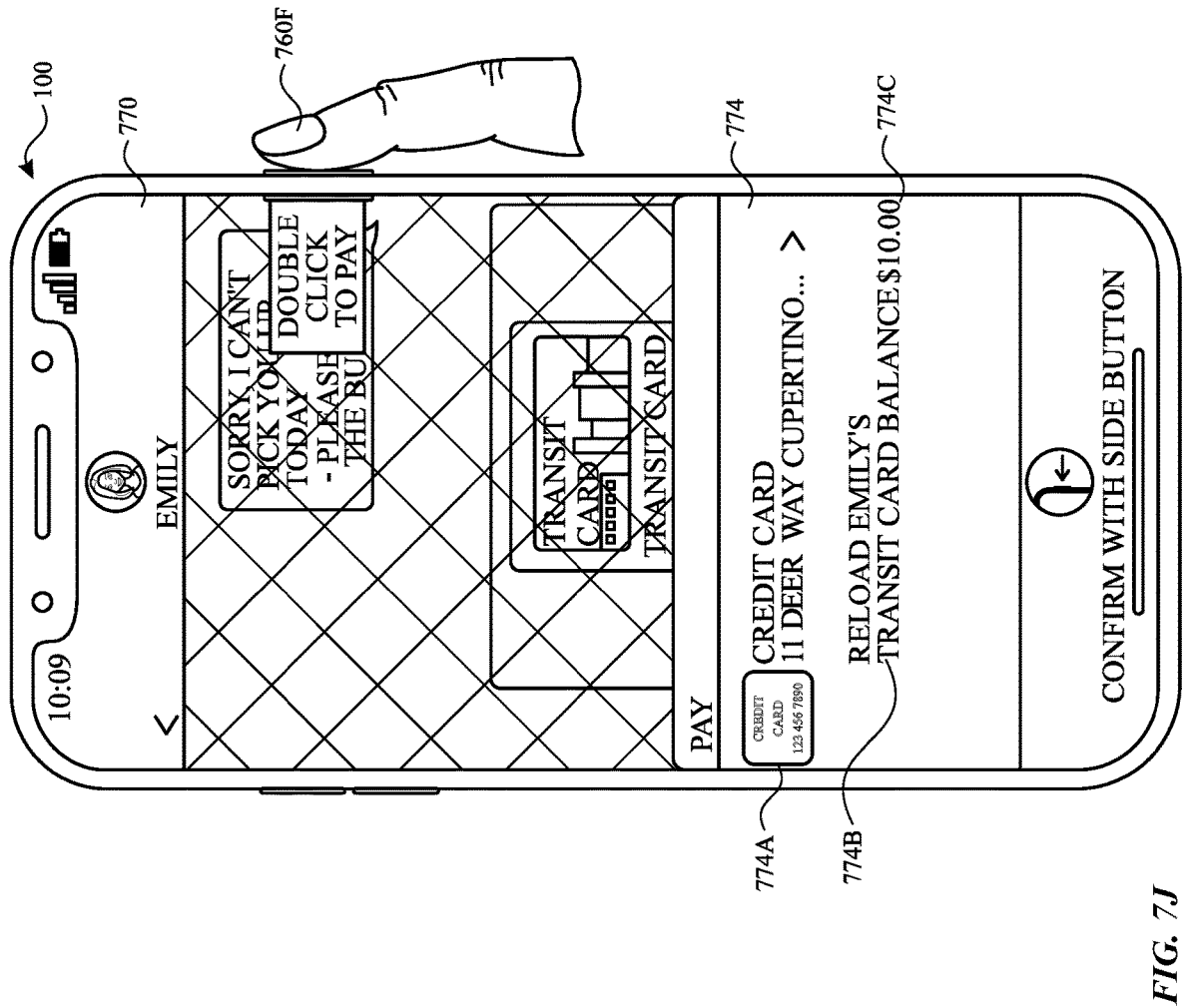
Figure 7J:
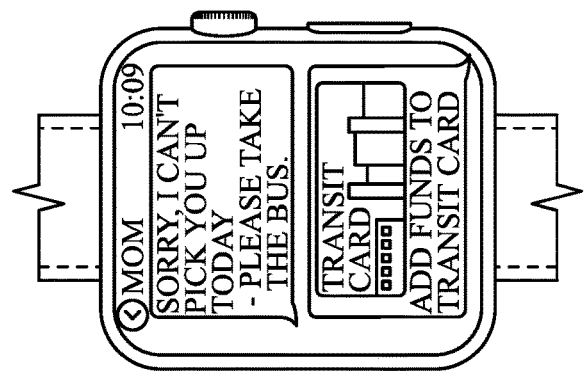

At FIG. 7I, computer system 100 detects input 760E (e.g., a tap input) on send option 770D and, in response, displays user interface 774 that is optionally overlaid on user interface 770, as shown in FIG. 7J. User interface 774 enables the user of computer system 100 to select an account 774A provisioned on computer system 100 from which funds will be transferred, indicates how much funds will be transferred 774C, and indicates the account (the transit account 774B) to which the funds will be transferred.

Figure 7K:
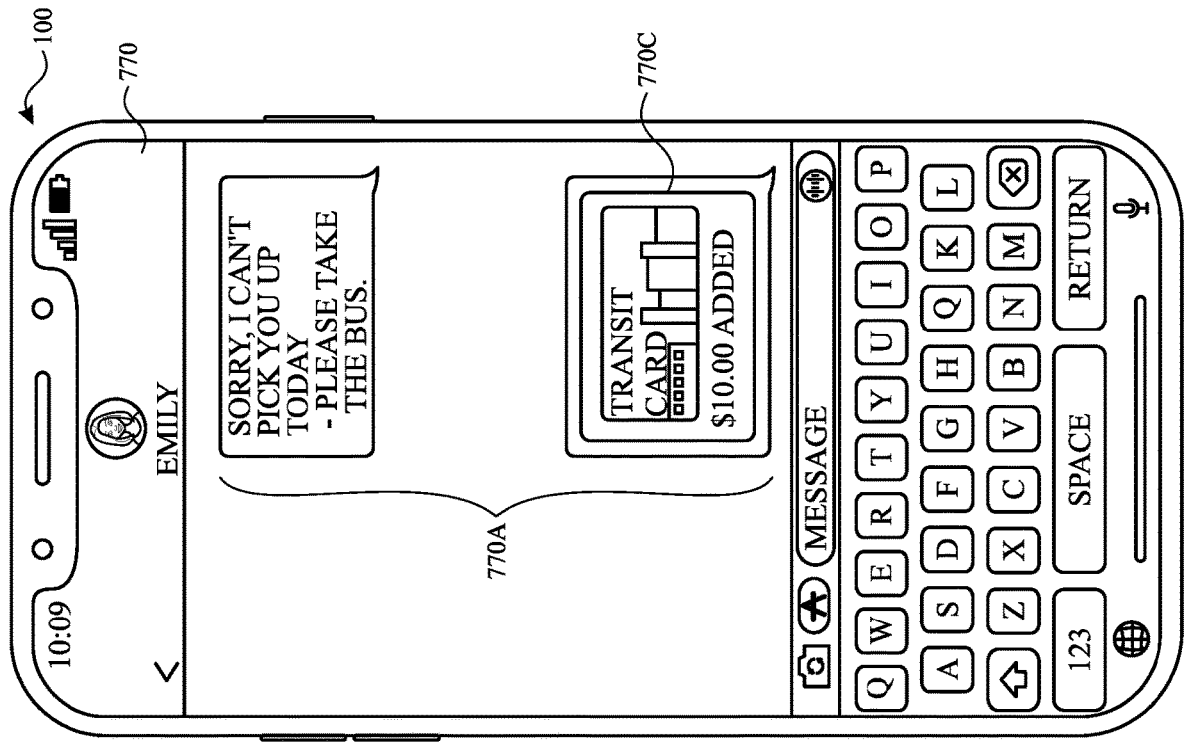
Figure 7K:
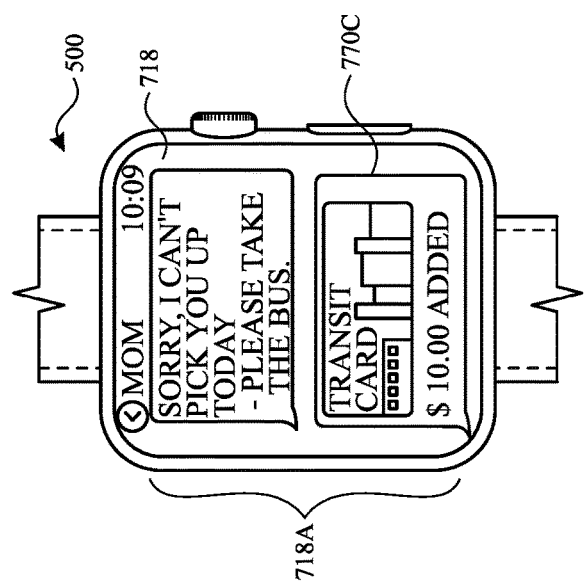

At FIG. 7J, computer system 100 detects user input 760F (e.g., a double-press of a hardware button 760F and/or biometric authentication) to authorize the transfer of funds and, in response (e.g., if the biometric authentication is successful) transmits message 770C to computer system 500 and updates conversation 770 to indicate that message 770C has been sent, as shown in FIG. 7K. In some embodiments, in response to detecting user input 760F (e.g., a double-press of a hardware button 760F and/or biometric authentication), computer system 100 replaces display of message 770B with message 770C. In some embodiments, in response to detecting user input 760F (e.g., a double-press of a hardware button 760F and/or biometric authentication), computer system 100 changes a visual appearance of message 770B and/or ceases to display message 770B.

At FIG. 7K, computer system 500 has received and displays message 770C, which indicates funds have been added to the transit account. In some embodiments, message 770C replaces message 718B. In some embodiments, computer system 500 changes a visual appearance of message 718B and/or ceases to display message 718B when message 770C is received and/or displayed.

Figure 7L:
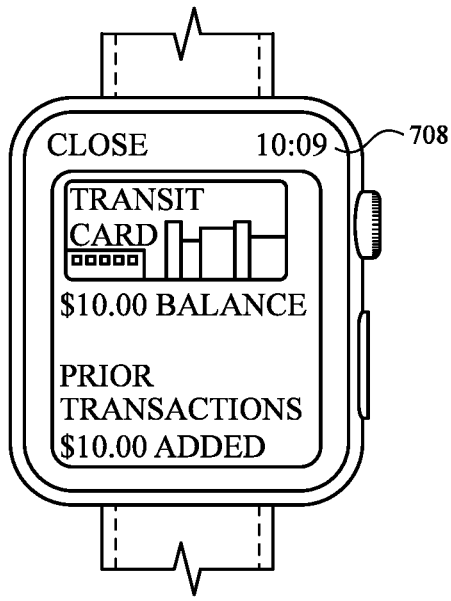
Figure 7M:
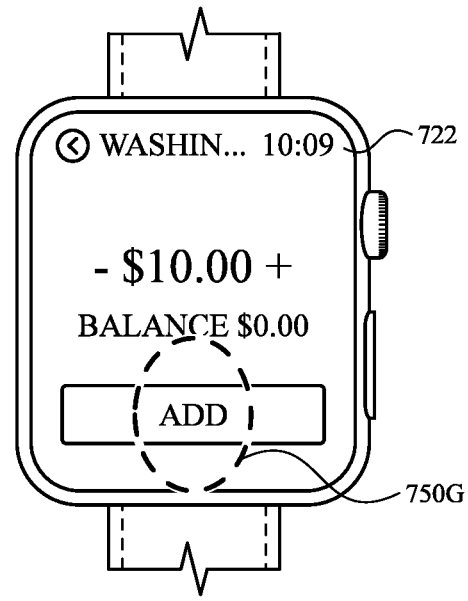

At FIG. 7L, user interface 708 now indicates that the transit account has funds available.

Figure 7N:
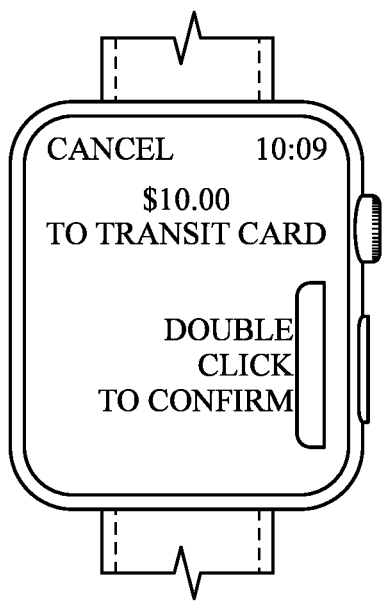
Figure 7O:
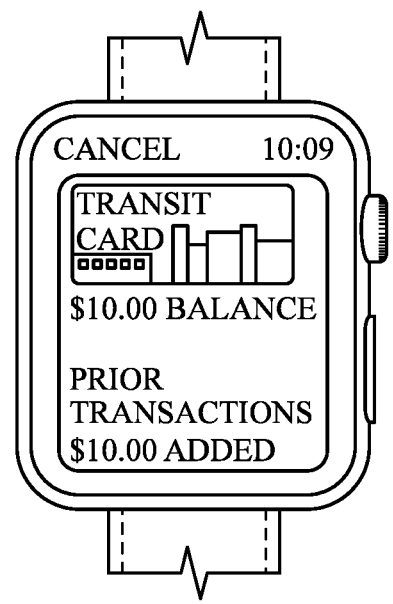

Returning to FIG. 7D, in response to input 750E (e.g., a tap input) on add funds option 714B, computer system 500 displays user interface 722, which enables the user to provide inputs to specify the amount of funds to be added to the transit account. Computer system 500 detects input 750G (e.g., a tap input) and, in response, displays the user interface of FIG. 7N, which optionally enables the user to specify the account from which funds should be transferred to the transit account. At FIG. 7O, once the user has authorized the transfer of funds, computer system 500 displays that the transit account has the respective amount of funds.

FIG. 8 is a flow diagram illustrating a method for requesting assets be added to an asset account using a computer system, in accordance with some embodiments. Method 700 is performed at a computer system (e.g., a smart watch 500, a smart phone, a personal computer) that is in communication with a display generation component (e.g., an integrated display; a display controller) and one or more input devices (e.g., a touch-sensitive surface (e.g., a touchscreen), a mouse, a keyboard) and is associated with a first user account (e.g., a child's account and/or a user account that has a first set of access rights at the computer system; an account of a primary user of the computer system) and a second user account (e.g., a guardian or parent's account and/or a user account that has a second set of access rights (e.g., permission-granting rights, configuration rights), different from the first set of access rights, at the computer system)(In some embodiments, the second set of access rights includes one or more access rights that are not possessed by the first user account), wherein the second user account is associated with an external computer system (e.g., a smart phone, a smart watch, a personal computer). Some operations in method 800 are, optionally, combined, the orders of some operations are, optionally, changed, and some operations are, optionally, omitted.

While the first user account is logged in at (e.g., is the active account) the computer system (e.g., 500), the computer system (e.g., 500) receives (802), via the one or more input devices, a request (e.g., 750D) (In some embodiments, the request does not identify a requestee/recipient of the request (e.g., the request is a set of one or more inputs that does not include inputs identifying a requestee/recipient of the request)) to add assets (e.g., service credits (e.g., transit service credits; printing credits; pre-paid minutes for a service; pre-paid monthly access to a service) and/or currency) to an asset account (e.g., a transit system account; a payment account; a store loyalty account) that is associated with the computer system (e.g., linked to the computer system and/or provisioned on the computer system). In some embodiments, one or more details of the asset account are stored in a secure element of the computer system. In some embodiments, a secure element is a hardware component (e.g., a secure microcontroller chip) (e.g., of the computer system) configured to securely store data or an algorithm such that the securely stored data is not accessible by the computer system without proper authentication information from a user of the computer system. Keeping the securely stored data in a secure element that is separate from other storage on the computer system prevents access to the securely stored data even if other storage locations on the computer system are compromised (e.g., by malicious code or other attempts to compromise information stored on the computer system). In some embodiments, the secure element provides (or releases) payment information (e.g., an account number and/or a transaction-specific dynamic security code). In some examples, the secure element provides (or releases) the payment information in response to the computer system receiving authorization, such as a user authentication (e.g., biometric authentication (e.g., fingerprint authentication; facial authentication; iris authentication; passcode authentication)).

In response to receiving the request (e.g., 750D) to add assets, the computer system (e.g., 500) displays (804), via the display generation component, a preview (e.g., 716) of a message (e.g., a text message, an email message) (and, optionally, sending the message), wherein the message is prepopulated (e.g., automatically includes (e.g., without requiring further user inputs)) with: contact information (806) (e.g., an email address, a texting address/handle 716A, and/or a phone number) for the second user account that designates the second user account as the recipient of the message. In some embodiments, the recipient of the message cannot be modified.

In response to receiving the request to add assets, the computer system (e.g., 500) displays (804), via the display generation component, the preview (e.g. 716) of the message (e.g., a text message, an email message) (and, optionally, sending the message), wherein the message is prepopulated (e.g., automatically includes (e.g., without requiring further user inputs)) with: a user-interactive graphical user interface object (e.g., 716B) (806), that, when selected at the external computer system (e.g., 100) (e.g., selected in a messaging application of the external computer system), initiates a process to add assets to the asset account (e.g., a process that involves one or more steps performed at an asset management server that is capable of communicating with the external computer system and the computer system). In some embodiments, the preview of the message is generated (in some embodiments, sent) without providing an option to specify a recipient of the message, other than the second user account. In some embodiments, the preview of the message is generated by a process that includes presenting one or more options for selecting recipient(s) of the message from a set of pre-determined potential recipients (e.g., restricted list (e.g., a list that includes the second user account and user accounts of one or more parents, guardians, individual(s) who provisioned the asset account at the computer system, individual(s) who configured one or more settings of the computer system, and/or emergency contacts associated with the first user account)). In some embodiments, the set of pre-determined potential recipients is less than the set of all contacts stored (e.g., stored in a contact list and/or contact application) at the computer system (e.g., 500).

Prepopulating the preview of the message with the contact information of the second user account reduces the number of inputs required to compose and complete the request, which performs an operation when a set of conditions has been met without requiring further user input.

Prepopulating the preview of the message with the contact information of the second user account (in some embodiments, of user accounts from a predetermined restricted set/list of accounts) reduces the risk that the request is sent to an incorrect and/or unauthorized user account, thereby enhancing security. Enhancing security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly, efficiently, and securely.

In accordance with some embodiments, the request to add assets is a user input (e.g., tap input 750D) corresponding to a first request user-interactive graphical element (e.g., 714A) that is displayed in a first user interface (e.g., 714, an interface of an e-wallet application and/or an interface that includes one or more details (e.g., a provider of the account, an asset balance of the account) of the asset account), wherein: in accordance with a determination that the computer system is associated (e.g., currently associated (e.g., the first user account is associated with the second asset account and the first user account is currently logged in at the computer system)) with a second asset account (e.g., corresponding to 712) (In some embodiments, an asset account that includes assets that can be transferred to the asset account), the first user interface (e.g., 714) includes (e.g., concurrently displayed with the request user-interactive graphical element) a transfer asset user-selectable graphical element (e.g., 714B, an "add asset" affordance) that, when selected, initiates a process for transferring assets from the second asset account to the asset account. In some embodiments, in accordance with a determination that the computer system is not associated with a second asset account (In some embodiments, an asset account that includes assets that can be transferred to the asset account), the first user interface does not include the transfer asset user-selectable graphical element. In some embodiments, the first user interface includes a non-selectable graphical element that includes an indication that a process/function for transferring assets is currently disabled (e.g., a grey-out "add asset" graphical element). Conditionally displaying a functional transfer asset user-selectable graphical element provides the user with feedback as to the availability of a second asset account associated with the computer system, which provides improved visual feedback to the user.

In accordance with some embodiments, the computer system (e.g., 500) receives, via the one or more input devices, a user input (e.g., 750E, a tap input) corresponding to the transfer asset user-selectable graphical element (e.g., 714B). In response to receiving the user input corresponding to the transfer asset user-selectable graphical element, the computer system (e.g., 500) initiates the process for transferring assets from the second asset account to the asset account (e.g., as shown in FIGS. 7L-7O).

In accordance with some embodiments, the computer system (e.g., 500) displays, via the display generation component, a second user interface (e.g., 714) (e.g., an interface of an e-wallet application and/or an interface that includes one or more details (e.g., a provider of the account, an asset balance of the account) of the asset account), wherein displaying the second user interface includes: in accordance with a determination that the computer system (e.g., 500) is not currently in a paired relationship of a first type (e.g., a mutual data transfer relationship) (In some embodiments, a relationship in which the external device can be used to perform one or more operations at the computer system) with an external device (e.g., a smart phone having a predefined set of hardware and/or software requirements), displaying a second request user-interactive graphical element (e.g., 714A), and in accordance with a determination the computer system is currently in a paired relationship of the first type with an external device, forgoing displaying the second request user-interactive graphical element (e.g., 714A). The request to add assets is a user input (e.g., 750D, a tap input) corresponding to the second request user-interactive graphical element. Conditionally displaying second request user-interactive graphical element provides the user with feedback as to the pairing state of the computer system, which provides improved visual feedback to the user; doing so also provides the asset request functionality when the pairing relationship conditions are met, which performs an operation when a set of conditions has been met without requiring further user input.

In accordance with some embodiments, the preview (e.g., 716) of the message is generated without providing an option (e.g., a user interface option) to specify an amount of assets to be requested. In some embodiments, the preview of the message does not include (and cannot include) a requested amount of assets. In some embodiments, a user of the computer system cannot specify an amount of assets to be requested.

In accordance with some embodiments, the computer system (e.g., 500) displays, concurrently with the preview (e.g., 716) of the message, a set of one or more user-interactive graphical elements (e.g., a keyboard; one or more pre-generated strings of text) that, when selected, adds text to the message (e.g., allows a user to add, to the message, text content that will be sent along with the message, when the message is sent). Displaying the set of one or more user-interactive graphical elements provides the user with feedback as to the functionality of adding text to the message, which provides improved visual feedback to the user.

In accordance with some embodiments, while displaying the preview (e.g., 716) of the message, the computer system receives, via the one or more input devices, a request (e.g., 750F) to transmit the message (e.g., a selection of a "send" affordance). In response to the request (e.g., 750F) to transmit the message, the computer system (e.g., 500) transmits the message to the second user account.

In accordance with some embodiments, after transmitting the message to the second user account, the computer system (e.g., 500) receives a first set of one or more user inputs that correspond to a request to display a message transcript of a message conversation between the first user account and the second user account. In response to receiving the first set of one or more user inputs, the computer system (e.g., 500) displays the message transcript (e.g., 718A) (In some embodiments, in a messaging application of the computer system) of the message conversation between the first user account and the second user account, wherein the message transcript includes the message. In some embodiments, the transcript further includes one or more messages previously sent from the first user account to the second user account and/or one or more messages previously sent from the second user account to the first user account. In some embodiments, in response to the request to transmit the message, the computer system displays the message transcript (e.g., automatically and/or without receiving and/or requiring further user input). Displaying the message in the message transcript provides the user with feedback as to the transmission state of the message and the recipient of the message, which provides improved visual feedback to the user.

In accordance with some embodiments, prior to receiving an indication (e.g., data transmitted from the external computer system and/or an asset management serve) that the process to add assets to the asset account is completed, the message (e.g., 718B) is displayed in the message transcript with a first appearance and after receiving the indication that the process to add assets to the asset account is completed, the message (e.g., 770C) is displayed in the message transcript (e.g., 718A) with a second appearance, different than the first appearance. In some embodiments, after receiving the indication, the message is replaced with a message indicating the completed request. Displaying the message with different visual states depending on completion of the process to add assets provides the user with feedback as to the state of the asset addition process, which provides improved visual feedback to the user; doing so also performs an operation when a set of conditions has been met without requiring further user input.

In accordance with some embodiments, transmitting the message to the second user account includes transmitting data (In some embodiments, as part of the contents of the message; In some embodiments, separately from the contents of the message) indicating the current asset balance of the asset account to the second user account.

In accordance with some embodiments, the request to add assets (e.g., 750F) is received while displaying a third user interface (e.g., 708) that concurrently includes: an indication (e.g., a textual or graphical indication) of a first detail of the asset account (e.g., a provider of the account, an asset balance of the account 708A, a recent transaction affecting the asset account, a use history of the asset account 708B); and an indication of a second detail of the asset account, different from the first detail. In some embodiments, the third user interface does not include indications of details of asset accounts other than the asset account. Displaying indications pertaining to the asset account while receiving the request to add assets provides feedback as to what account is being affected, which provides improved visual feedback to the user.

In accordance with some embodiments, the process to add assets to the asset account includes the external computer system (e.g., 100) displaying an asset addition user interface (e.g., 772) that includes a set of one or more user-interactive graphical elements (e.g., 772D, one or more numeric keys and/or pre-selected amounts) that, when selected, determines an amount of assets to be added to the asset account. Displaying the set of one or more user-interactive graphical elements for determining an amount of assets provides the user of the external computer system with feedback as to the availability of the function to select the amount of assets to add, which provides improved visual feedback.

In accordance with some embodiments, the asset addition user interface (e.g., 772) of the external computer system (e.g., 100) includes: an indication (e.g., 772C, a textual and/or graphical indication) of the current asset balance of the asset account, prior to completion of the process to add assets to the asset account; and an indication (e.g., 772B, a textual and/or graphical indication) of a future balance of the asset account, after completion of the process to add assets to the asset account. Displaying indications pertaining to the balances of asset account provides the user of the external computer system with feedback as to the quantitative details of the asset transfer operation, which provides improved visual feedback.

In accordance with some embodiments, the asset addition user interface (e.g., 772) of the external computer system (e.g., 100) includes: an indication (e.g., 772F, a textual and/or graphical indication) identifying the first user account; and an indication (e.g., 772A, a textual and/or graphical indication) identifying the asset account. Displaying indications pertaining to the asset account provides the user of the external computer system with feedback as which asset account is being affected, which provides improved visual feedback.

As described below, method 800 provides an intuitive way for requesting assets be added to an asset account. The method reduces the cognitive burden on a user for requesting assets be added to an asset account, thereby creating a more efficient human-machine interface. For battery-operated computing devices, enabling a user to request that assets be added to an asset account faster and more efficiently conserves power and increases the time between battery charges.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the process of requesting assets be added to an asset account. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to request assets from a relevant user. Accordingly, use of such personal information data enables users to have calculated control of the requesting process. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in requesting assets during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system configured to communicate with a display generation component and one or more input devices and is associated with a first user account, a second user account, and a first asset account, wherein the second user account is associated with an external computer system, and wherein the first user account and the second user account are associated with different users, comprising:
   one or more processors; and
   memory storing one or more programs configured to be executed by the one or more processors, the one or more programs including instructions for:
      displaying a first user interface, wherein:
         the first user interface includes a first request user-interactive graphical element;
         in accordance with a determination that the computer system is associated with a second asset account, wherein the second asset account includes assets that can be transferred to the first asset account, the first user interface includes a transfer asset user-selectable graphical element that, when selected, initiates a process for transferring assets from the second asset account to the first asset account; and
         in accordance with a determination that the computer system is not associated with the second asset account, the first user interface does not include a transfer asset user-configurable graphical element;
      while the first user account is logged in at the computer system, receiving, via the one or more input devices, a request to add assets to the first asset account, wherein the request to add assets to the first asset account includes a user input corresponding to the first request user-interactive graphical element;
      in response to receiving the request to add assets to the first asset account, displaying, via the display generation component, a preview of a message, wherein the message is prepopulated with:
         contact information for the second user account that designates the second user account as a recipient of the message; and
         a user-interactive graphical user interface object, that, when selected at the external computer system, initiates a process to add assets to the first asset account;
      while displaying the preview of the message, receiving, via the one or more input devices, a request to transmit the message; and
      in response to receiving the request to transmit the message, transmitting the message to the second user account at the external computer system.

2. The computer system of claim 1, wherein the one or more programs further include instructions for:
   receiving, via the one or more input devices, a user input corresponding to the transfer asset user-selectable graphical element; and
   in response to receiving the user input corresponding to the transfer asset user-selectable graphical element, initiating the process for transferring assets from the second asset account to the first asset account.

3. The computer system of claim 1, wherein the one or more programs further include instructions for:
   displaying, via the display generation component, a second user interface, wherein displaying the second user interface includes:
      in accordance with a determination that the computer system is not currently in a paired relationship of a first type with an external device, displaying a second request user-interactive graphical element; and
      in accordance with a determination the computer system is currently in a paired relationship of the first type with an external device, forgoing displaying the second request user-interactive graphical element; and
   wherein the request to add assets is a user input corresponding to the second request user-interactive graphical element.

4. The computer system of claim 1, wherein the preview of the message is generated without providing an option to specify an amount of assets to be requested.

5. The computer system of claim 1, wherein the one or more programs further include instructions for:

displaying, concurrently with the preview of the message, a set of one or more user-interactive graphical elements that, when selected, adds text to the message.

6. The computer system of claim 1, wherein the one or more programs further include instructions for:
after transmitting the message to the second user account, receiving a first set of one or more user inputs that correspond to a request to display a message transcript of a message conversation between the first user account and the second user account; and
in response to receiving the first set of one or more user inputs, displaying the message transcript of the message conversation between the first user account and the second user account, wherein the message transcript includes the message.

7. The computer system of claim 6, wherein:
prior to receiving an indication that the process to add assets to the first asset account is completed, the message is displayed in the message transcript with a first appearance; and
after receiving the indication that the process to add assets to the first asset account is completed, the message is displayed in the message transcript with a second appearance, different than the first appearance.

8. The computer system of claim 1, wherein transmitting the message to the second user account includes transmitting data indicating a current asset balance of the first asset account to the second user account.

9. The computer system of claim 1, wherein the request to add assets is received while displaying a third user interface that concurrently includes:
an indication of a first detail of the first asset account; and
an indication of a second detail of the first asset account, different from the first detail.

10. The computer system of claim 1, wherein the process to add assets to the first asset account includes the external computer system displaying an asset addition user interface that includes a set of one or more user-interactive graphical elements that, when selected, determines an amount of assets to be added to the first asset account.

11. The computer system of claim 10, wherein the asset addition user interface of the external computer system includes:
an indication of a current asset balance of the first asset account, prior to completion of the process to add assets to the first asset account; and
an indication of a future balance of the first asset account, after completion of the process to add assets to the first asset account.

12. The computer system of claim 10, wherein the asset addition user interface of the external computer system includes:
an indication identifying the first user account; and
an indication identifying the first asset account.

13. A non-transitory computer-readable storage medium storing one or more programs configured to be executed by one or more processors of a computer system that is in communication with a display generation component and one or more input devices and is associated with a first user account, a second user account, and a first asset account, wherein the second user account is associated with an external computer system, and wherein the first user account and the second user account are associated with different users, the one or more programs including instructions for:
displaying a first user interface, wherein:
the first user interface includes a first request user-interactive graphical element;
in accordance with a determination that the computer system is associated with a second asset account, wherein the second asset account includes assets that can be transferred to the first asset account, the first user interface includes a transfer asset user-selectable graphical element that, when selected, initiates a process for transferring assets from the second asset account to the first asset account; and
in accordance with a determination that the computer system is not associated with the second asset account, the first user interface does not include a transfer asset user-configurable graphical element;
while the first user account is logged in at the computer system, receiving, via the one or more input devices, a request to add assets to the first asset account, wherein the request to add assets to the first asset account includes a user input corresponding to the first request user-interactive graphical element;
in response to receiving the request to add assets to the first asset account, displaying, via the display generation component, a preview of a message, wherein the message is prepopulated with:
contact information for the second user account that designates the second user account as a recipient of the message; and
a user-interactive graphical user interface object, that, when selected at the external computer system, initiates a process to add assets to the first asset account;
while displaying the preview of the message, receiving, via the one or more input devices, a request to transmit the message; and
in response to receiving the request to transmit the message, transmitting the message to the second user account at the external computer system.

14. The non-transitory computer-readable storage medium of claim 13, wherein the one or more programs further include instructions for:
receiving, via the one or more input devices, a user input corresponding to the transfer asset user-selectable graphical element; and
in response to receiving the user input corresponding to the transfer asset user-selectable graphical element, initiating the process for transferring assets from the second asset account to the first asset account.

15. The non-transitory computer-readable storage medium of claim 13, wherein the one or more programs further include instructions for:
displaying, via the display generation component, a second user interface, wherein displaying the second user interface includes:
in accordance with a determination that the computer system is not currently in a paired relationship of a first type with an external device, displaying a second request user-interactive graphical element; and
in accordance with a determination the computer system is currently in a paired relationship of the first type with an external device, forgoing displaying the second request user-interactive graphical element; and
wherein the request to add assets is a user input corresponding to the second request user-interactive graphical element.

16. The non-transitory computer-readable storage medium of claim 13, wherein the preview of the message is generated without providing an option to specify an amount of assets to be requested.

17. The non-transitory computer-readable storage medium of claim 13, wherein the one or more programs further include instructions for:
displaying, concurrently with the preview of the message, a set of one or more user-interactive graphical elements that, when selected, adds text to the message.

18. The non-transitory computer-readable storage medium of claim 13, wherein the one or more programs further include instructions for:
after transmitting the message to the second user account, receiving a first set of one or more user inputs that correspond to a request to display a message transcript of a message conversation between the first user account and the second user account; and
in response to receiving the first set of one or more user inputs, displaying the message transcript of the message conversation between the first user account and the second user account, wherein the message transcript includes the message.

19. The non-transitory computer-readable storage medium of claim 18, wherein:
prior to receiving an indication that the process to add assets to the first asset account is completed, the message is displayed in the message transcript with a first appearance; and
after receiving the indication that the process to add assets to the first asset account is completed, the message is displayed in the message transcript with a second appearance, different than the first appearance.

20. The non-transitory computer-readable storage medium of claim 13, wherein transmitting the message to the second user account includes transmitting data indicating a current asset balance of the first asset account to the second user account.

21. The non-transitory computer-readable storage medium of claim 13, wherein the request to add assets is received while displaying a third user interface that concurrently includes:
an indication of a first detail of the first asset account; and
an indication of a second detail of the first asset account, different from the first detail.

22. The non-transitory computer-readable storage medium of claim 13, wherein the process to add assets to the first asset account includes the external computer system displaying an asset addition user interface that includes a set of one or more user-interactive graphical elements that, when selected, determines an amount of assets to be added to the first asset account.

23. The non-transitory computer-readable storage medium of claim 22, wherein the asset addition user interface of the external computer system includes:
an indication of a current asset balance of the first asset account, prior to completion of the process to add assets to the first asset account; and
an indication of a future balance of the first asset account, after completion of the process to add assets to the first asset account.

24. The non-transitory computer-readable storage medium of claim 22, wherein the asset addition user interface of the external computer system includes:
an indication identifying the first user account; and
an indication identifying the first asset account.

25. A method, comprising:
at a computer system that is in communication with a display generation component and one or more input devices and is associated with a first user account, a second user account, and a first asset account, wherein the second user account is associated with an external computer system, and wherein the first user account and the second user account are associated with different users:
displaying a first user interface, wherein:
the first user interface includes a first request user-interactive graphical element;
in accordance with a determination that the computer system is associated with a second asset account, wherein the second asset account includes assets that can be transferred to the first asset account, the first user interface includes a transfer asset user-selectable graphical element that, when selected, initiates a process for transferring assets from the second asset account to the first asset account; and
in accordance with a determination that the computer system is not associated with the second asset account, the first user interface does not include a transfer asset user-configurable graphical element;
while the first user account is logged in at the computer system, receiving, via the one or more input devices, a request to add assets to the first asset account, wherein the request to add assets to the first asset account includes a user input corresponding to the first request user-interactive graphical element;
in response to receiving the request to add assets to the first asset account, displaying, via the display generation component, a preview of a message, wherein the message is prepopulated with:
contact information for the second user account that designates the second user account as a recipient of the message; and
a user-interactive graphical user interface object, that, when selected at the external computer system, initiates a process to add assets to the first asset account;
while displaying the preview of the message, receiving, via the one or more input devices, a request to transmit the message; and
in response to receiving the request to transmit the message, transmitting the message to the second user account at the external computer system.

26. The method of claim 25, further comprising:
receiving, via the one or more input devices, a user input corresponding to the transfer asset user-selectable graphical element; and
in response to receiving the user input corresponding to the transfer asset user-selectable graphical element, initiating the process for transferring assets from the second asset account to the first asset account.

27. The method of claim 25, further comprising:
displaying, via the display generation component, a second user interface, wherein displaying the second user interface includes:
in accordance with a determination that the computer system is not currently in a paired relationship of a first type with an external device, displaying a second request user-interactive graphical element; and
in accordance with a determination the computer system is currently in a paired relationship of the first type with an external device, forgoing displaying the second request user-interactive graphical element; and
wherein the request to add assets is a user input corresponding to the second request user-interactive graphical element.

28. The method of claim 25, wherein the preview of the message is generated without providing an option to specify an amount of assets to be requested.

29. The method of claim 25, further comprising:
displaying, concurrently with the preview of the message, a set of one or more user-interactive graphical elements that, when selected, adds text to the message.

30. The method of claim 25, further comprising:
after transmitting the message to the second user account, receiving a first set of one or more user inputs that correspond to a request to display a message transcript of a message conversation between the first user account and the second user account; and
in response to receiving the first set of one or more user inputs, displaying the message transcript of the message conversation between the first user account and the second user account, wherein the message transcript includes the message.

31. The method of claim 30, wherein:
prior to receiving an indication that the process to add assets to the first asset account is completed, the message is displayed in the message transcript with a first appearance; and
after receiving the indication that the process to add assets to the first asset account is completed, the message is displayed in the message transcript with a second appearance, different than the first appearance.

32. The method of claim 25, wherein transmitting the message to the second user account includes transmitting data indicating a current asset balance of the first asset account to the second user account.

33. The method of claim 25, wherein the request to add assets is received while displaying a third user interface that concurrently includes:
an indication of a first detail of the first asset account; and
an indication of a second detail of the first asset account, different from the first detail.

34. The method of claim 25, wherein the process to add assets to the first asset account includes the external computer system displaying an asset addition user interface that includes a set of one or more user-interactive graphical elements that, when selected, determines an amount of assets to be added to the first asset account.

35. The method of claim 34, wherein the asset addition user interface of the external computer system includes:
an indication of a current asset balance of the first asset account, prior to completion of the process to add assets to the first asset account; and
an indication of a future balance of the first asset account, after completion of the process to add assets to the first asset account.

36. The method of claim 34, wherein the asset addition user interface of the external computer system includes:
an indication identifying the first user account; and
an indication identifying the first asset account.

* * * * *

UNITED STATES PATENT AND TRADEMARK OFFICE
CERTIFICATE OF CORRECTION

| | |
|---|---|
| PATENT NO. | : 11,784,956 B2 |
| APPLICATION NO. | : 17/874159 |
| DATED | : October 10, 2023 |
| INVENTOR(S) | : Pablo Pons Bordes et al. |

It is certified that error appears in the above-identified patent and that said Letters Patent is hereby corrected as shown below:

In the Claims

In Column 39, Line 67, in Claim 1, delete "element:" and insert -- element; --.

Signed and Sealed this
Twelfth Day of December, 2023

Katherine Kelly Vidal
*Director of the United States Patent and Trademark Office*